(12) United States Patent
Germain et al.

(10) Patent No.: US 7,031,125 B2
(45) Date of Patent: Apr. 18, 2006

(54) RESET LOCKOUT FOR SLIDING LATCH GFCI

(75) Inventors: Frantz Germain, Rosedale, NY (US); Stephen Stewart, Uniondale, NY (US); David Herzfeld, Huntington, NY (US); Steve Campolo, Malverne, NY (US); Nicholas L. DiSalvo, Levittown, NY (US); William R. Ziegler, East Northport, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 228 days.

(21) Appl. No.: 09/812,875

(22) Filed: Mar. 20, 2001

(65) Prior Publication Data

US 2002/0067582 A1 Jun. 6, 2002

Related U.S. Application Data

(63) Continuation-in-part of application No. 09/688,481, filed on Oct. 16, 2000, now Pat. No. 6,437,700.

(51) Int. Cl.
*H02H 9/08* (2006.01)

(52) U.S. Cl. .......................................... 361/42; 361/43

(58) Field of Classification Search ................ 361/42, 361/43, 44, 45, 46, 47, 48, 49, 50, 71–75, 361/51; 335/18
See application file for complete search history.

(56) References Cited

U.S. PATENT DOCUMENTS

| 3,309,571 | A | 3/1967 | Gilker |
| 3,538,477 | A | 11/1970 | Walters et al. |
| 3,702,418 | A | 11/1972 | Obenhaus |
| 3,731,154 | A | 5/1973 | Toroslan |
| 3,864,649 | A | 2/1975 | Doyle |
| 3,872,354 | A | 3/1975 | Nestor et al. |
| 3,949,336 | A | 4/1976 | Dietz |
| 4,002,951 | A | 1/1977 | Halbeck |
| 4,034,266 | A | 7/1977 | Virani et al. ................ 361/42 |
| 4,034,360 | A | 7/1977 | Schweitzer, Jr. |
| 4,063,299 | A | 12/1977 | Munroe |
| 4,086,549 | A | 4/1978 | Slater et al. |
| 4,223,365 | A | 9/1980 | Moran |
| 4,237,435 | A | * 12/1980 | Cooper et al. ............... 335/18 |
| 4,316,230 | A | 2/1982 | Hansen |
| 4,442,470 | A | 4/1984 | Misencik |
| 4,521,824 | A | 6/1985 | Morris et al. |
| 4,567,456 | A | 1/1986 | Legatti |
| 4,574,260 | A | 3/1986 | Franks |
| 4,578,732 | A | 3/1986 | Draper |
| 4,587,588 | A | 5/1986 | Goldstein |
| 4,595,894 | A | 6/1986 | Doyle et al. ................ 335/18 |
| 4,631,624 | A | 12/1986 | Dorak et al. |
| 4,719,437 | A | 1/1988 | Yun ........................... 335/18 |
| 4,802,052 | A | * 1/1989 | Brant et al. ................. 361/42 |

(Continued)

FOREIGN PATENT DOCUMENTS

| AU | 759587 | 7/2003 |
| EP | 0 526 071 A | 2/1993 |
| GB | 830018 | 3/1960 |
| GB | 2207823 | 2/1989 |
| GB | 2290181 A | 12/1995 |
| WO | WO 96/01484 A | 1/1996 |
| WO | PCT/US99/19319 | 3/2000 |
| WO | PCT/US00/22955 | 3/2001 |
| WO | PCT/US01/32562 | 4/2002 |

*Primary Examiner*—Brian Sircus
*Assistant Examiner*—Danny Nguyen
(74) *Attorney, Agent, or Firm*—Paul J. Sutton

(57) ABSTRACT

Resettable circuit interrupting devices using a center latch are provided. The circuit interrupting devices include those with a reset lockout, reverse wiring protection, and/or an independent trip portion.

1 Claim, 36 Drawing Sheets

U.S. PATENT DOCUMENTS

| | | | |
|---|---|---|---|
| 4,851,951 A | 7/1989 | Foster, Jr. | 361/50 |
| 4,901,183 A | 2/1990 | Lee | |
| 4,967,308 A | 10/1990 | Morse | |
| 4,979,070 A | 12/1990 | Bodkin | |
| 5,148,344 A | 9/1992 | Astley et al. | |
| 5,202,662 A | 4/1993 | Bienwald et al. | |
| 5,223,810 A | 6/1993 | Van Haaren | 335/18 |
| 5,224,006 A | 6/1993 | MacKenzie et al. | 361/45 |
| 5,229,730 A | 7/1993 | Legatti et al. | |
| 5,347,248 A | 9/1994 | Herbert | |
| 5,418,678 A | 5/1995 | McDonald | |
| 5,448,443 A | 9/1995 | Muelleman | |
| 5,477,412 A | 12/1995 | Neiger et al. | |
| 5,517,165 A | 5/1996 | Cook | |
| 5,541,800 A | 7/1996 | Misencik | |
| 5,555,150 A | 9/1996 | Newman | |
| 5,594,398 A | 1/1997 | Marcou et al. | 335/18 |
| 5,600,524 A | 2/1997 | Neiger et al. | 361/42 |
| 5,617,284 A | 4/1997 | Paradise | |
| 5,625,285 A | 4/1997 | Virgilo et al. | |
| 5,628,394 A | 5/1997 | Benke et al. | |
| 5,631,798 A | 5/1997 | Seymour et al. | |
| 5,637,000 A * | 6/1997 | Osterbrock et al. | 439/107 |
| 5,655,648 A | 8/1997 | Rosen et al. | |
| 5,661,623 A | 8/1997 | McDonald et al. | |
| 5,694,280 A | 12/1997 | Zhou | |
| 5,706,155 A | 1/1998 | Neiger et al. | |
| 5,729,417 A | 3/1998 | Neiger et al. | |
| 5,805,397 A | 9/1998 | MacKenzie | 361/42 |
| 5,815,363 A | 9/1998 | Chu | |
| 5,825,602 A | 10/1998 | Tosaka et al. | |
| 5,844,765 A | 12/1998 | Kato et al. | |
| 5,847,913 A | 12/1998 | Turner et al. | |
| 5,875,087 A | 2/1999 | Spencer et al. | |
| 5,933,063 A | 8/1999 | Keung et al. | |
| 5,943,198 A | 8/1999 | Hirsh et al. | |
| 5,956,218 A | 9/1999 | Berthold | |
| 5,963,408 A | 10/1999 | Neiger et al. | |
| 6,040,967 A | 3/2000 | DiSalvo | 361/42 |
| 6,052,265 A | 4/2000 | Zaretsky et al. | |
| 6,226,161 B1 | 5/2001 | Gershen | |
| 6,246,558 B1 | 6/2001 | DiSalvo et al. | 361/42 |
| 6,252,407 B1 | 6/2001 | Gershen | |
| 6,282,070 B1 | 8/2001 | Ziegler et al. | |
| 6,288,882 B1 | 9/2001 | DiSalvo et al. | |
| 6,309,248 B1 * | 10/2001 | King | 439/535 |
| 6,324,043 B1 | 11/2001 | Turner | |
| 6,381,112 B1 | 4/2002 | DiSalvo et al. | |
| 6,437,700 B1 | 8/2002 | Herzfeld et al. | |
| 6,437,953 B1 | 8/2002 | DiSalvo et al. | |
| D462,660 S * | 9/2002 | Huang et al. | D13/139.3 |
| 6,580,344 B1 | 6/2003 | Li | |
| 6,590,172 B1 | 7/2003 | Gadre et al. | |
| 6,590,753 B1 | 7/2003 | Finlay | |
| 6,621,388 B1 | 9/2003 | Macbeth | |
| 6,646,838 B1 | 11/2003 | Ziegler et al. | |
| 6,657,834 B1 | 12/2003 | DiSalvo | |
| 6,671,145 B1 | 12/2003 | Germain et al. | |
| 6,693,779 B1 | 2/2004 | DiSalvo | |
| 6,717,782 B1 | 4/2004 | DiSalvo et al. | |
| 6,771,152 B1 | 8/2004 | Germain et al. | |
| 2003/0085783 A1 | 5/2003 | Macbeth | |
| 2003/0151478 A1 | 8/2003 | Radosavljevic et al. | |

* cited by examiner

| MODE | LED INDICATOR | | | PIEZO BEEPER |
|---|---|---|---|---|
| | GREEN | RED | AMBER | |
| SUPERVISORY | SLOW | NA | NA | OFF |
| 25 DAYS | FAST | NA | NA | OFF |
| 30 DAYS | NA | NA | FAST | OFF |
| TRIP-EXTERNAL FAULT | NA | NA | FAST | ON |
| FAULT IN GFCI | NA | FAST | NA | ON |
| POWER ON RESET | NA | NA | FAST | OFF |

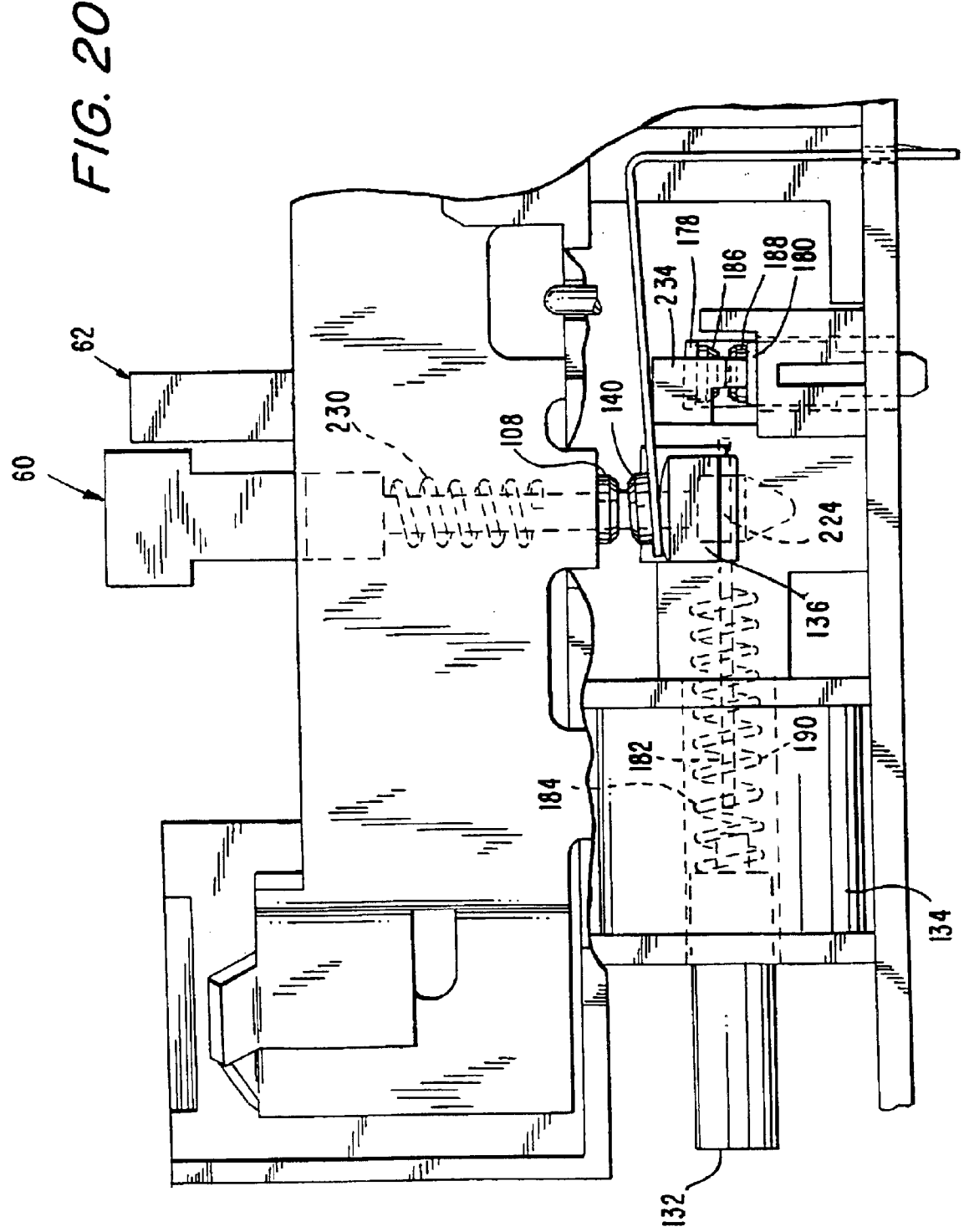

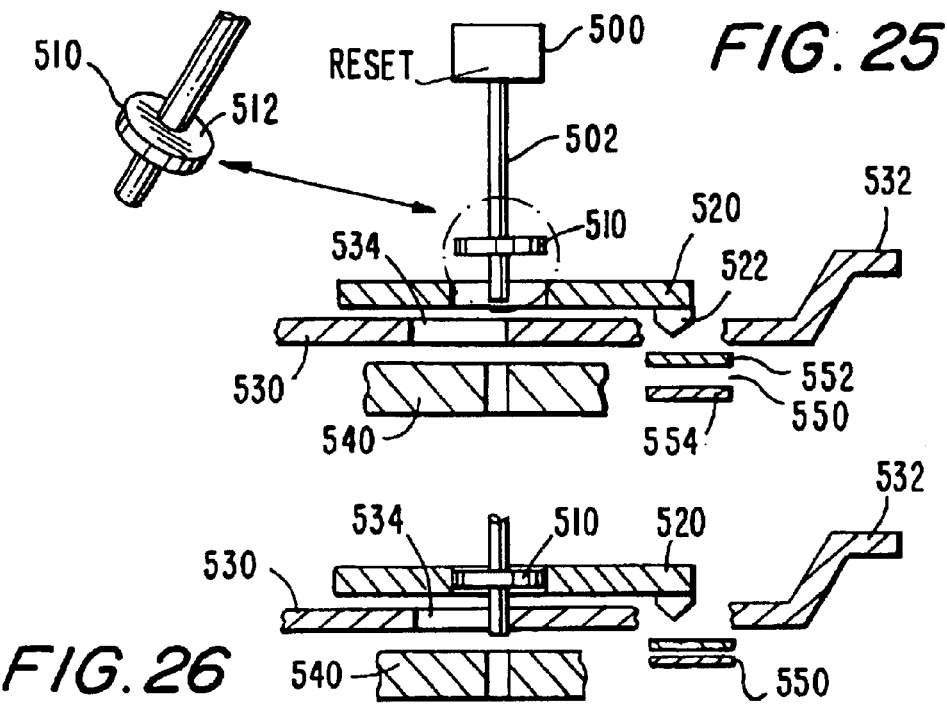
FIG. 25
FIG. 26
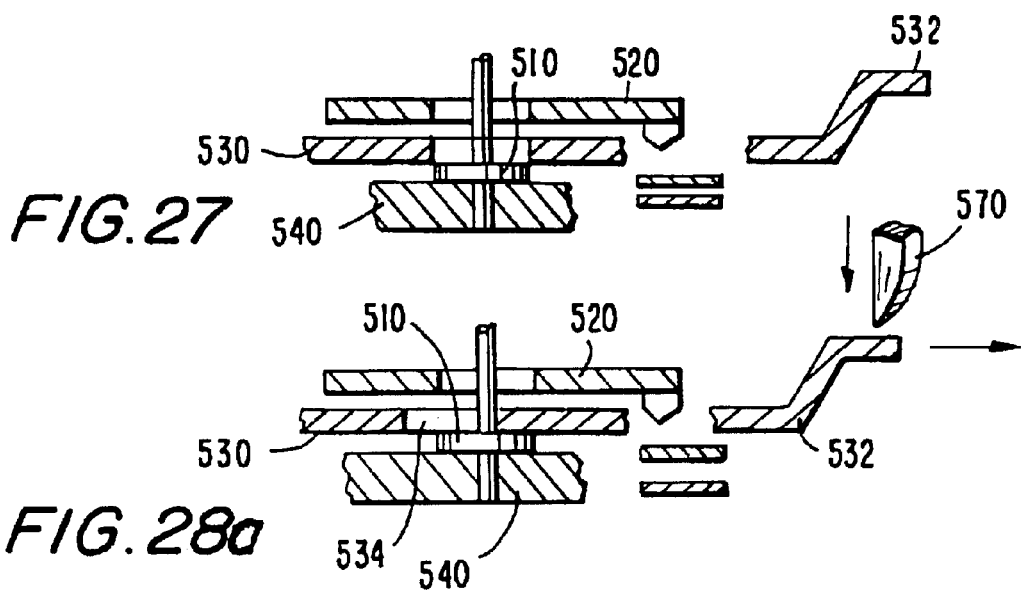
FIG. 27
FIG. 28a
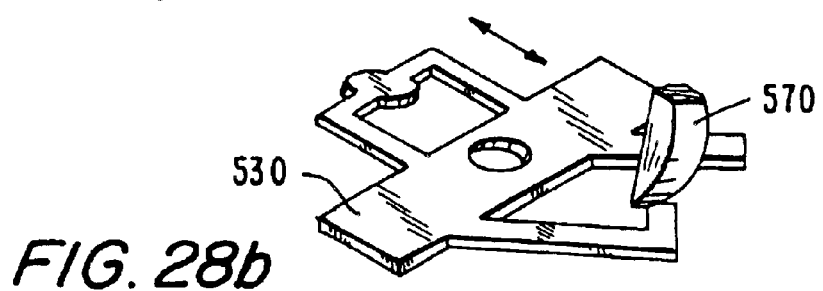
FIG. 28b

RESET LOCKOUT FOR SLIDING LATCH GFCI

CROSS REFERENCE TO RELATED APPLICATIONS

This application is a continuation-in-part of application Ser. No. 09/688,481 filed Oct. 16, 2000 now U.S. Pat. No. 6,437,700, which is incorporated herein in its entirety by reference.

This application is related to commonly owned application Ser. No. 09/812,288, filed Mar. 20, 2001, entitled Circuit Interrupting Device with Reset Lockout and Reverse Wiring Protection and Method of Manufacture, by inventors Steven Campolo, Nicholas DiSalvo and William R. Ziegler, which is a continuation-in-part of application Ser. No. 09/379,138 filed Aug. 20, 1999, which is a continuation-in-part of application Ser. No. 09/369,759 filed Aug. 6, 1999, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/812,624, filed Mar. 20, 2001, entitled Reset Lockout Mechanism and Independent Trip Mechanism for Center Latch Circuit Interrupting Device, by inventors Frantz Germain, Steven Stewart, Roger Bradley, David Chan, Nicholas L. DiSalvo and William R. Ziegler, herein incorporated by reference.

This application is related to commonly owned application Ser. No. 09/379,140 filed Aug. 20, 1999, which is a continuation-in-part of application Ser. No. 09/369,759 filed Aug. 6, 1999, which is a continuation-in-part of application Ser. No. 09/138,955, filed Aug. 24, 1998, now U.S. Pat. No. 6,040,967, all of which are incorporated herein in their entirety by reference.

BACKGROUND

1. Field

The present application is directed to resettable circuit interrupting devices including without limitation ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms.

2. Description of the Related Art

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections. The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters (GFCI), for example. Presently available GFCI devices, such as the device described in commonly owned U.S. Pat. No. 4,595,894, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

However, instances may arise where an abnormal condition, caused by for example a lightning strike, occurs which may result not only in a surge of electricity at the device and a tripping of the device but also a disabling of the trip mechanism used to cause the mechanical breaking of the circuit. This may occur without the knowledge of the user. Under such circumstances an unknowing user, faced with a GFCI which has tripped, may press the reset button which, in turn, will cause the device with an inoperative trip mechanism to be reset without the ground fault protection available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (versus load) side of the GFCI device, an instance may arise where a current path is created from the phase (or hot) wire supplying power to the GFCI device through the load side of the device and a person to ground. In the event that an open neutral condition exists, current GFCI devices, which have tripped, may be reset even though the open neutral condition may remain.

Commonly owned application Ser. No. 09/138,955, filed Aug. 24, 1998, now U.S. Pat. No. 6,040,967, which is incorporated herein in its entirety by reference, describes a family of resettable circuit interrupting devices capable of locking out the reset portion of the device if the circuit interrupting portion is non-operational or if an open neutral condition exists.

Accordingly, it may be advantageous to lockout the reset function under certain circumstances.

Additionally, some of the circuit interrupting devices described above also have a user accessible load connection. The load side connection and user accessible load connection are typically electrically connected together. An example of such a circuit interrupting device is a typical GFCI receptacle, where the line and load side connections are binding screws and the user accessible load side connection is the plug connection to an internal receptacle. As noted, such devices are connected to external wiring so that line wires are connected to the line side connection and load side wires are connected to the load side connection. However, instances may occur where the circuit interrupting device is improperly connected to the external wires so that the load wires are connected to the line side connection and the line wires are connected to the load connection. This is known as reverse wiring. In the event the circuit interrupting device is reverse wired, fault protection to the user accessible load connection may be eliminated, even if fault protection to the load side connection remains. For example, when a conventional GFCI is reverse wired, the face receptacle is "upstream" from the current imbalance sensor coil. Accordingly, if the conventional GFCI is in either the tripped or normal state, the face receptacle is provide unprotected power.

SUMMARY

The present application relates to a resettable circuit interrupting devices that provide a reset lockout under certain conditions. Certain embodiments of the present application are directed to circuit interrupting devices including a reset lock out portion capable of preventing the device from resetting if the circuit interrupting portion is not functioning, if an open neutral condition exists or if the device is mis-wired by testing portions of a device before allowing a reset. Certain embodiments maintain fault protection for the circuit interrupting device even if the device is reverse wired by utilizing a bridge circuit to separately break the line inputs from each respective load side connector and user load connector.

The circuit interrupting device may also include reset lockout portion that prevents the reestablishing of electrical continuity in either the phase or neutral conductive path or both conductive paths, unless the circuit interrupting portion is operating properly and/or connected properly. In certain, the reset portion may be configured so that at least one reset contact is electrically connected to the sensing portion of the circuit interrupting portion, and that depression of a reset button causes at least a portion of the phase conductive path to contact at least one reset contact. When contact is made between the phase conductive path and the at least one reset contact, the circuit interrupting portion is activated so that the reset lockout portion is disabled and electrical continuity in the phase and neutral conductive paths can be reestablished.

The circuit interrupting device may also include a trip portion that operates independently of the circuit interrupting portion. In one embodiment, the trip portion includes a trip actuator accessible from an exterior of the housing and a trip arm preferably within the housing and extending from the trip actuator. The trip arm is preferably configured to facilitate mechanical breaking of electrical continuity in the phase and/or neutral conductive paths, if the trip actuator is actuated.

In certain embodiments, the circuit interrupter is manufactured having a bridge circuit separately disconnecting a load side and a user load when the circuit interrupter trips. In another embodiment, two single-pole, single throw switching devices are used to switch each power line from the load and the user load respectively. In another embodiment, the circuit interrupter is manufactured in a reset lock out state. In another embodiment, a removable or fixedly connected trip force device is utilized to force a trip upon installation. In another embodiment, an indicator provides an indication of reverse wiring. In another embodiment, a separate trip force device is connected to the circuit interrupter before it is delivered into the stream of commerce. In a method embodiment, the circuit interrupter is set to a reset lock out state before being delivered into the stream of commerce.

BRIEF DESCRIPTION OF THE DRAWINGS

Preferred embodiments of the present application are described herein with reference to the drawings in which similar elements are given similar reference characters, wherein:

FIG. 20 is a side elevational view of the device of FIG. 19;

FIGS. 25–28b are partial cutaway diagrams of the reset lockout mechanism of a GFCI according to an embodiment of the present invention;

FIGS. 31a–f are partial cutaway diagrams of the reset lockout mechanism of a GFCI according to the embodiment of FIG. 29a–c showing a manual trip mechanism;

FIGS. 38a–c are perspective views of one embodiment of a ground fault circuit interrupting device according to the present application having a user load activated switch device;

DETAILED DESCRIPTION OF EMBODIMENTS

Figure 1:
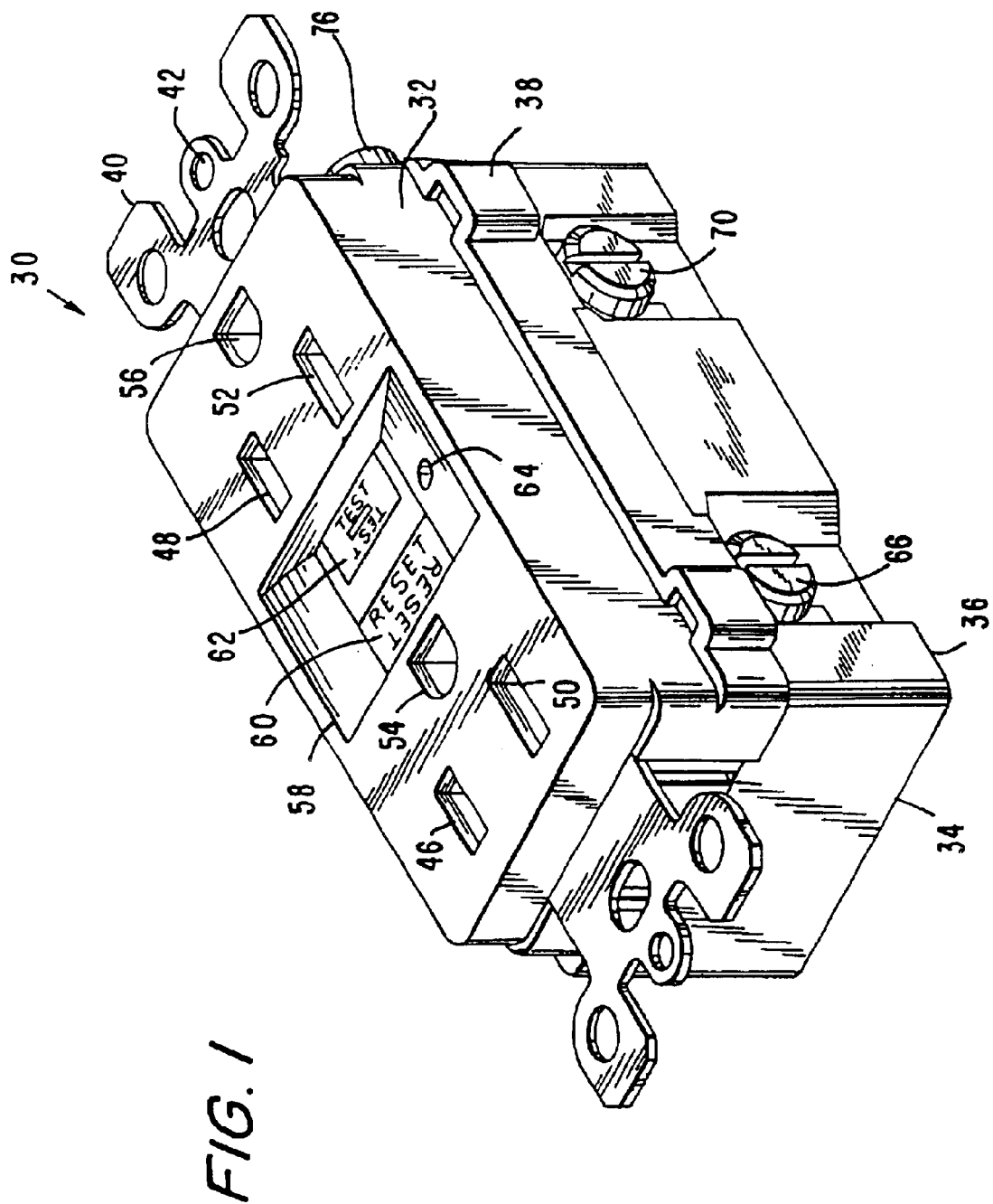
FIG. 1 is a perspective view of a GFCI constructed in accordance with the concepts of the invention.

The present application contemplates various types of circuit interrupting devices that are capable of breaking at least one conductive path at both a line side and a load side of the device. The conductive path is typically divided between a line side that connects to supplied electrical power and a load side that connects to one or more loads. As noted, the various devices in the family of resettable circuit interrupting devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the structure or mechanisms used in the circuit interrupting devices, shown in the drawings and described hereinbelow, are incorporated into a GFCI receptacle suitable for installation in a single-gang junction box used in, for example, a residential electrical wiring system. However, the mechanisms according to the present application can be included in any of the various devices in the family of resettable circuit interrupting devices.

The GFCI receptacles described herein have line and load phase (or power) connections, line and load neutral connections and user accessible load phase and neutral connections. The connections permit external conductors or appliances to be connected to the device. These connections may be, for example, electrical fastening devices that secure or connect external conductors to the circuit interrupting device, as well as conduct electricity. Examples of such connections include binding screws, lugs, terminals and external plug connections.

The circuit interrupting and reset portions described herein preferably use electro-mechanical components to break (open) and make (close) one or more conductive paths between the line and load sides of the device. However, electrical components, such as solid state switches and supporting circuitry, may be used to open and close the conductive paths.

Generally, the circuit interrupting portion is used to automatically break electrical continuity in one or more conductive paths (i.e., open the conductive path) between the line and load sides upon the detection of a fault, which in the embodiments described is a ground fault. The reset portion is used to close the open conductive paths. In the embodiments including a reset lockout, the reset portion is used to disable the reset lockout, in addition to closing the open conductive paths. In this configuration, the operation of the reset and reset lockout portions is in conjunction with the operation of the circuit interrupting portion, so that electrical continuity in open conductive paths cannot be reset if the circuit interrupting portion is non-operational, if an open neutral condition exists and/or if the device is reverse wired.

In an alternative embodiment, the circuit interrupting devices may also include a trip portion that operates independently of the circuit interrupting portion so that in the event the circuit interrupting portion becomes non-operational the device can still be tripped. Preferably, the trip portion is manually activated and uses mechanical components to break one or more conductive paths. However, the trip portion may use electrical circuitry and/or electromechanical components to break either the phase or neutral conductive path or both paths.

The above-described features can be incorporated in any resettable circuit interrupting device, but for simplicity the descriptions herein are directed to GFCI receptacles. A more detailed description of a GFCI receptacle is provided in U.S. Pat. No. 4,595,894, which is incorporated herein in its entirety by reference and in commonly owned application number 09/688,481, which is incorporated herein in its entirety by reference. It should also be noted that binding screws are exemplary of the types of wiring terminals that can be used to provide the electrical connections. Examples of other types of wiring terminals include set screws, pressure clamps, pressure plates, push-in type connections, pigtails and quick-connect tabs.

Several illustrative embodiments of a center latch GFCI are now provided.

Figure 2:
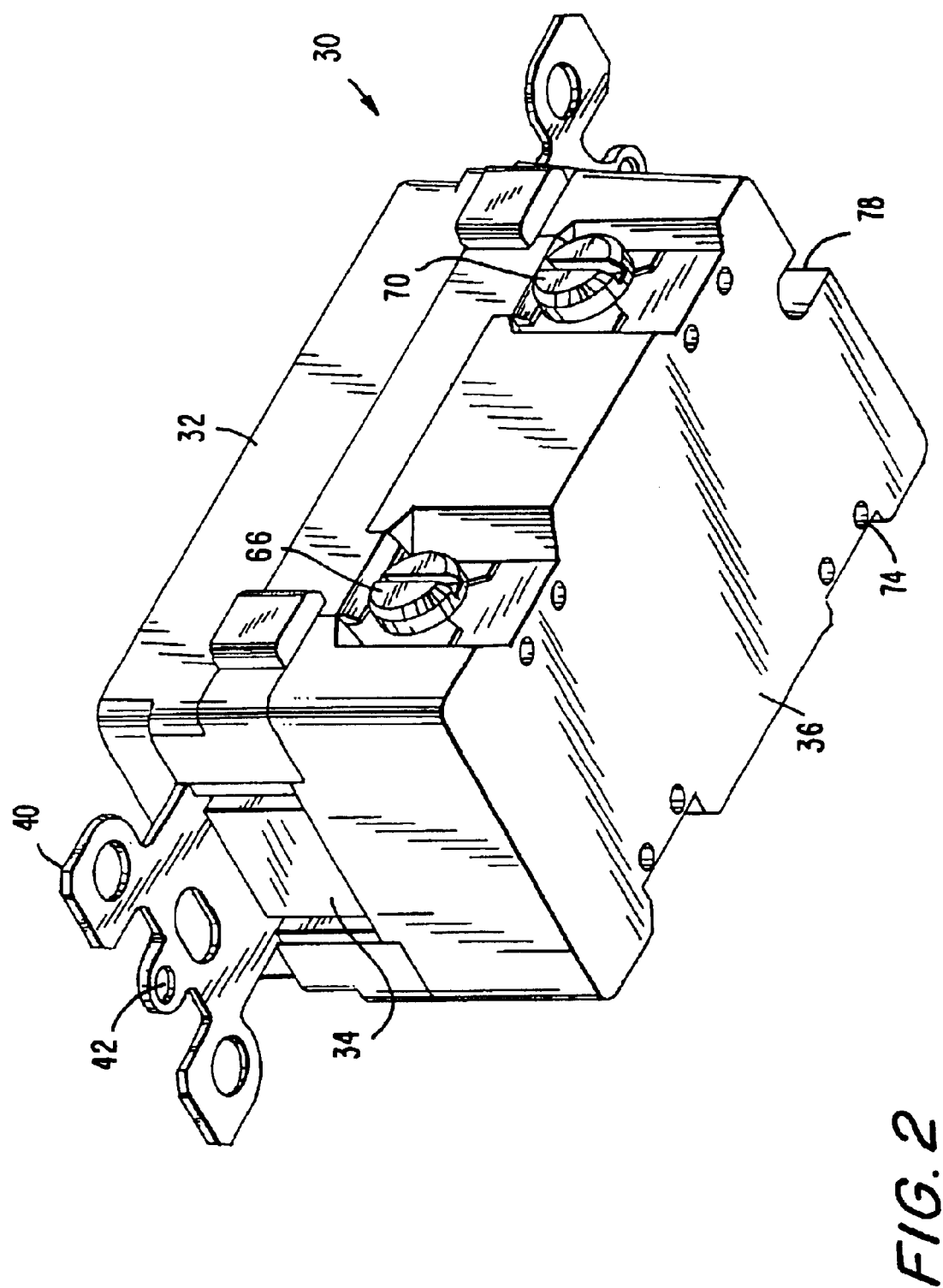
FIG. 2 is a bottom perspective view of the GFCI of FIG. 1.

Turning now to FIGS. 1 and 2, a GFCI 30 according to the present invention is shown. GFCI 30 is made up of a top cover 32, middle housing 34 and a bottom housing 36 held in assembly by the deflectable tabs (not shown) on bottom housing 36 engaging the U-shaped members 38 on top cover 32. A mounting strap 40 is mounted between top cover 32 and middle housing 34 and has two apertures 42 to mount the GFCI 30 to the mounting ears of a standard gang box (not shown). Top cover 32 has a face 44 which contains two sets of slots each to receive a three-bladed grounded plug (not shown). Each set of slots is made up of a slot 46, 48 of a first length and a slot 50, 52 of a longer length and a U-shaped slot 54, 56 to receive the grounding prong of the plug. Because the slots 50, 52 are longer than the slots 46, 48 the plug is naturally polarized and conforms to NEMA standard 5-15R. In the depression 58 in top cover 32 is placed a reset button 60, a test button 62 and an indicator lamp means 64. Indicator lamp means 64 is a dual color lamp which produces a first color when a first filament is activated, a second color when a second filament is activated and a third color when both filaments are activated. Bottom housing 36 has a series of four terminal screws (only two of which are shown in the figures). Terminal screw 66 is connected to the load neutral terminal as will be described below. A similar terminal screw 68 is connected to the load phase terminal. Terminal screw 70 is connected to the line neutral terminal and a similar terminal screw 72 is connected to the line phase terminal as will be described below. Adjacent each terminal screw 66, 68, 70 and 72 are two apertures 74 to receive the bared ends of electrical conductors (not shown). As will be described below, the conductor ends extend between a terminal contact and a wire nut which engages the conductor and pushes it against the terminal contact as the terminal screw is advanced. At the rear wall of middle housing 34 is a grounding screw 76 to which may fastened a ground conductor (not shown inserted into slot 78.)

Figure 3:
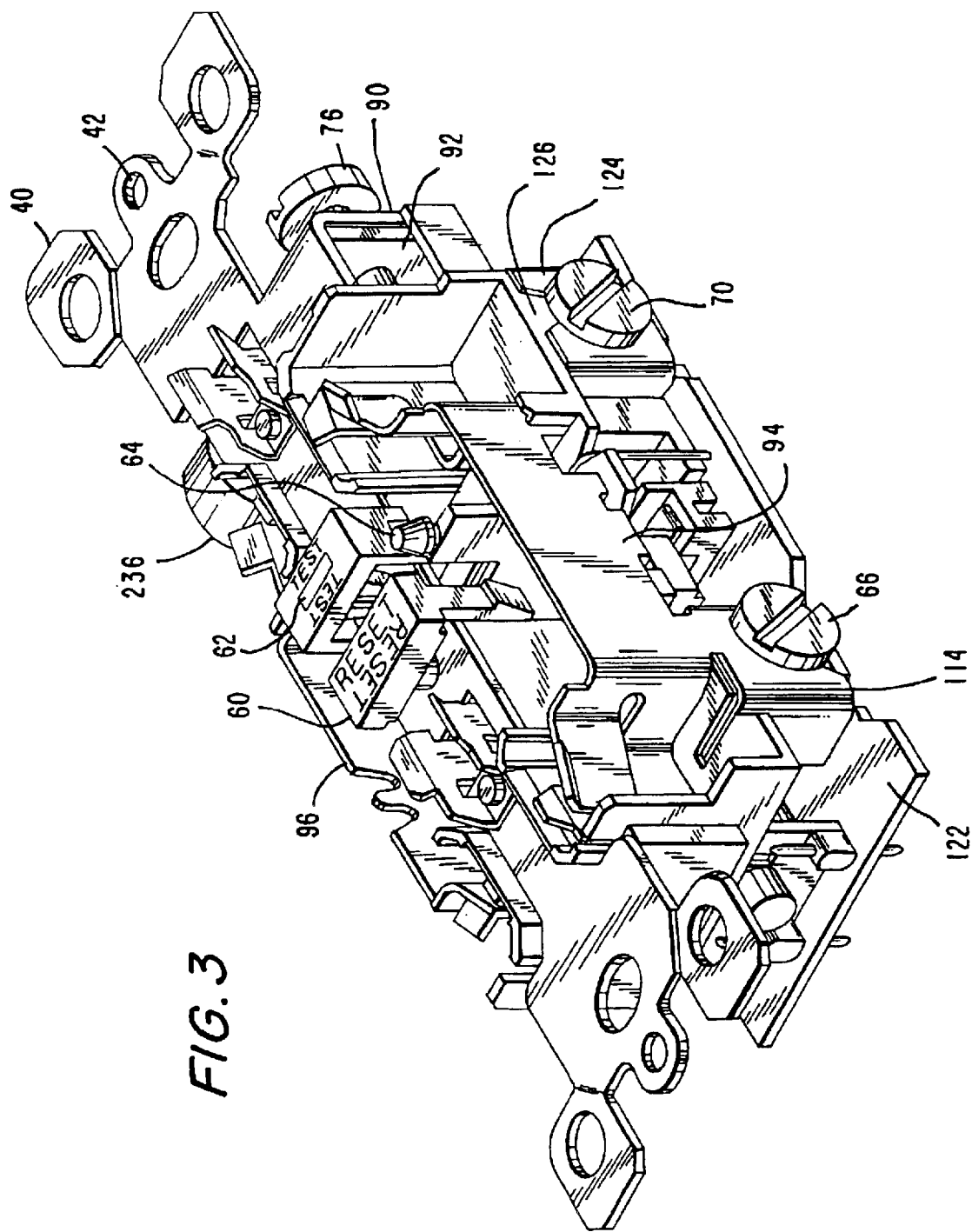
FIG. 3 is similar to FIG. 1 but with the top and bottom covers of the GFCI removed.
Figure 4:
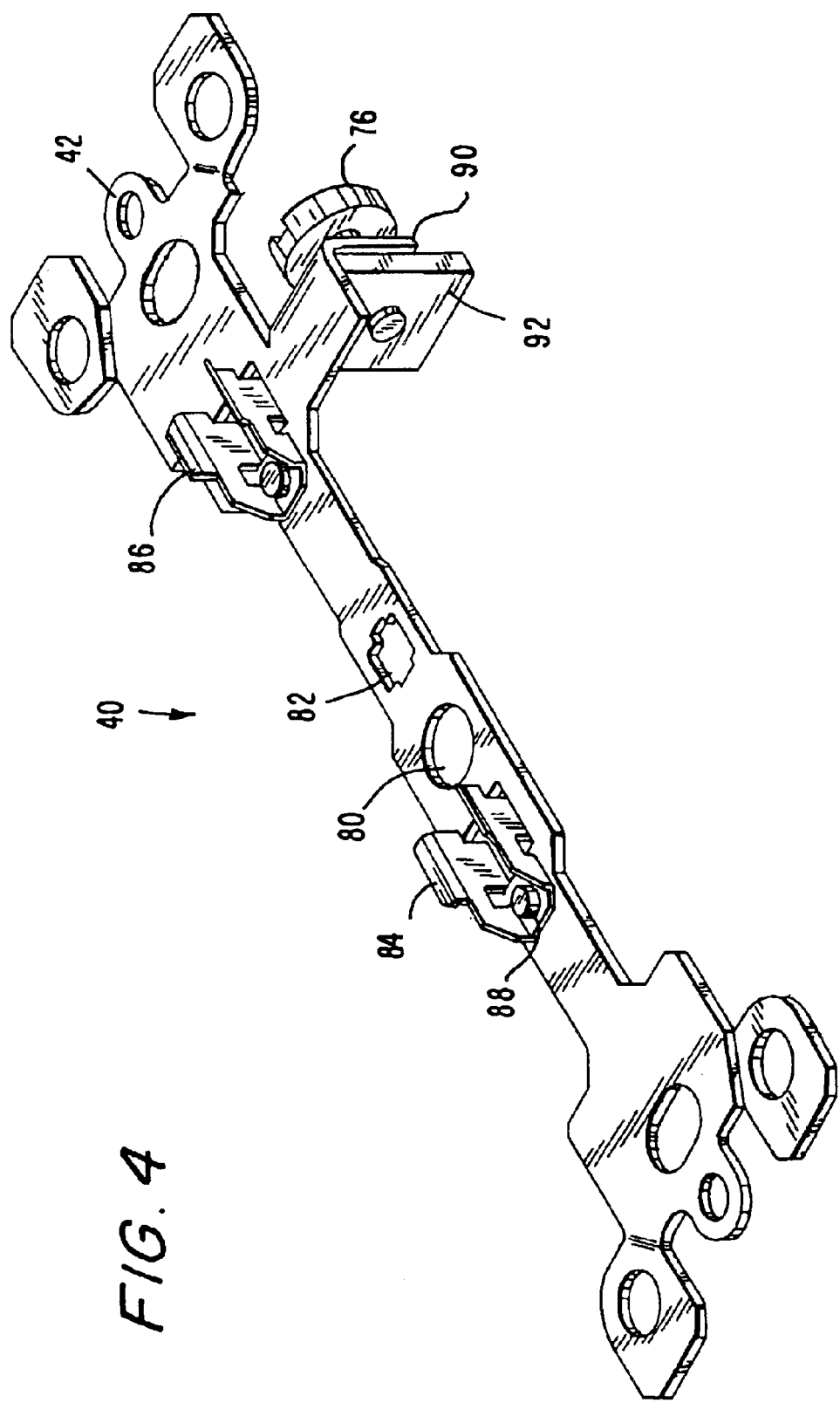
FIG. 4 is a perspective view of the mounting strap of the device of FIG. 1.
Figure 5:
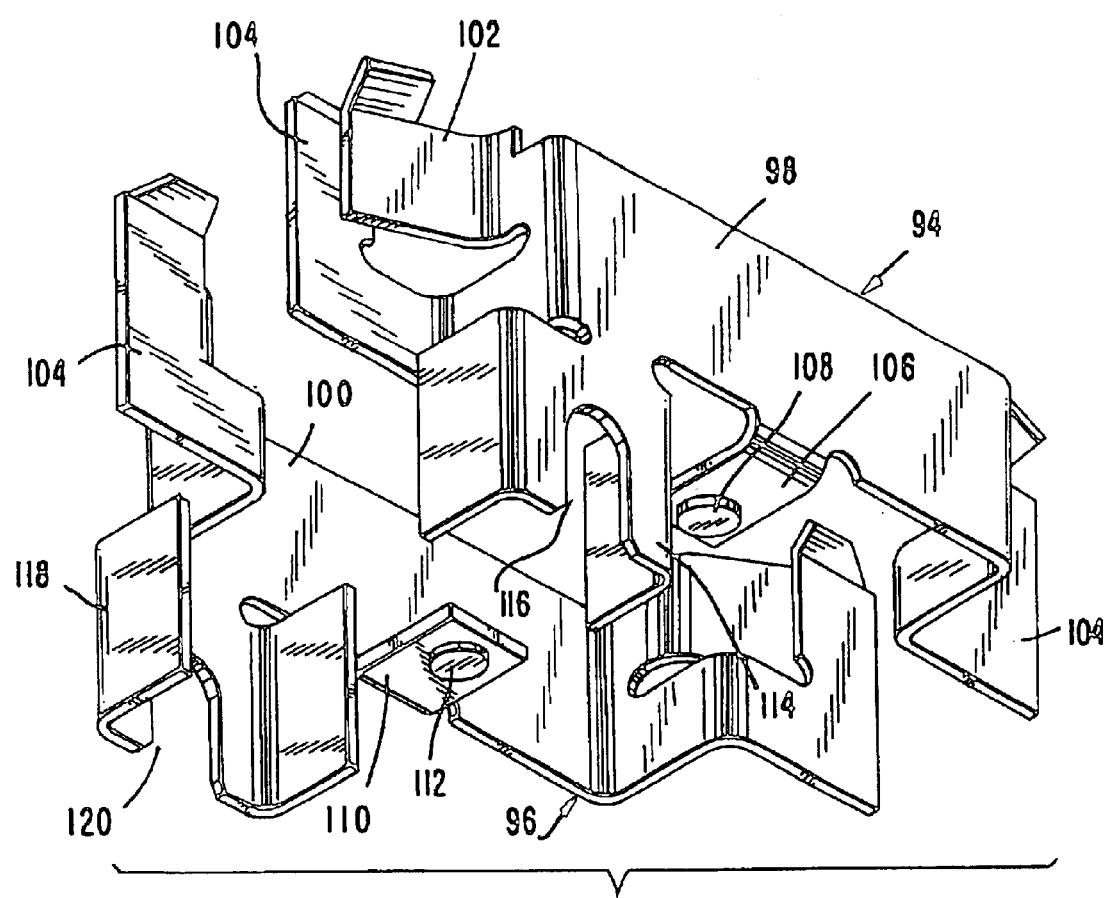
FIG. 5 is a bottom perspective view of the load neutral and load phase terminals of the device of FIG. 1.

Turning now to FIG. 3 which shows GFCI 30 with the top cover 32 and the bottom housing 36 removed and FIGS. 4 and 5 which show details of the mounting strap 40 and the load phase and neutral terminals. Mounting strap 40 has two apertures 42 as above described and a generally centrally located circular opening 80 to receive the reset lever and a square opening 82 to receive the test lever. Two clips 84, 86 are arranged to engage the grounding prong of inserted plugs and are connected to mounting strap 40 by rivets 88. A bent down tab 90 has a threaded aperture to receive the ground screw 76. A ground nut 92 is pulled against tab 90 as ground screw 76 is advanced to hold the bared end of a conductor inserted in slot 78 and between tab 90 and ground nut 92.

FIG. 5 shows the load neutral terminal 94 and the load phase terminal 96. Each terminal 94, 96 has a central body portion 98, 100, respectively, with male blade grip fingers 102, 104 at each end. The male blades of the plug with fit between each pair of grip fingers 102, 104 to make mechanical and electrical contact with the male blades of the inserted plug. An interned tab 106 on load neutral terminal 94 receives the main fixed neutral contact 106 while interned tab 110 receives the main fixed phase contact 112. A depending three sided tab 114 has a slot 116 to receive therethough the threaded portion of terminal screw 66. A similar depending three sided tab 118 has a slot 120 to receive therethrough the threaded portion of terminal screw 68.

In FIG. 3 the mounting strap 40 of FIG. 4 and the terminals 94, 96 of FIG. 5 are shown assembled to middle housing 34. Also mounted to middle housing 34 is the printed circuit board (hereafter PCB) 122 which contains the various circuits which determine the indicator lamp means color, its blinking rate and control the beeper. The PCB 122 also contains the various components of the fault detectors, transformers and solenoid as will be described below. Terminal screw 70 is connected to a tab 124 having a slot 126 therein to receive the threaded portion of terminal screw 70. A similar structure is present for terminal screw 72 not visible in the figure.

Figure 6:
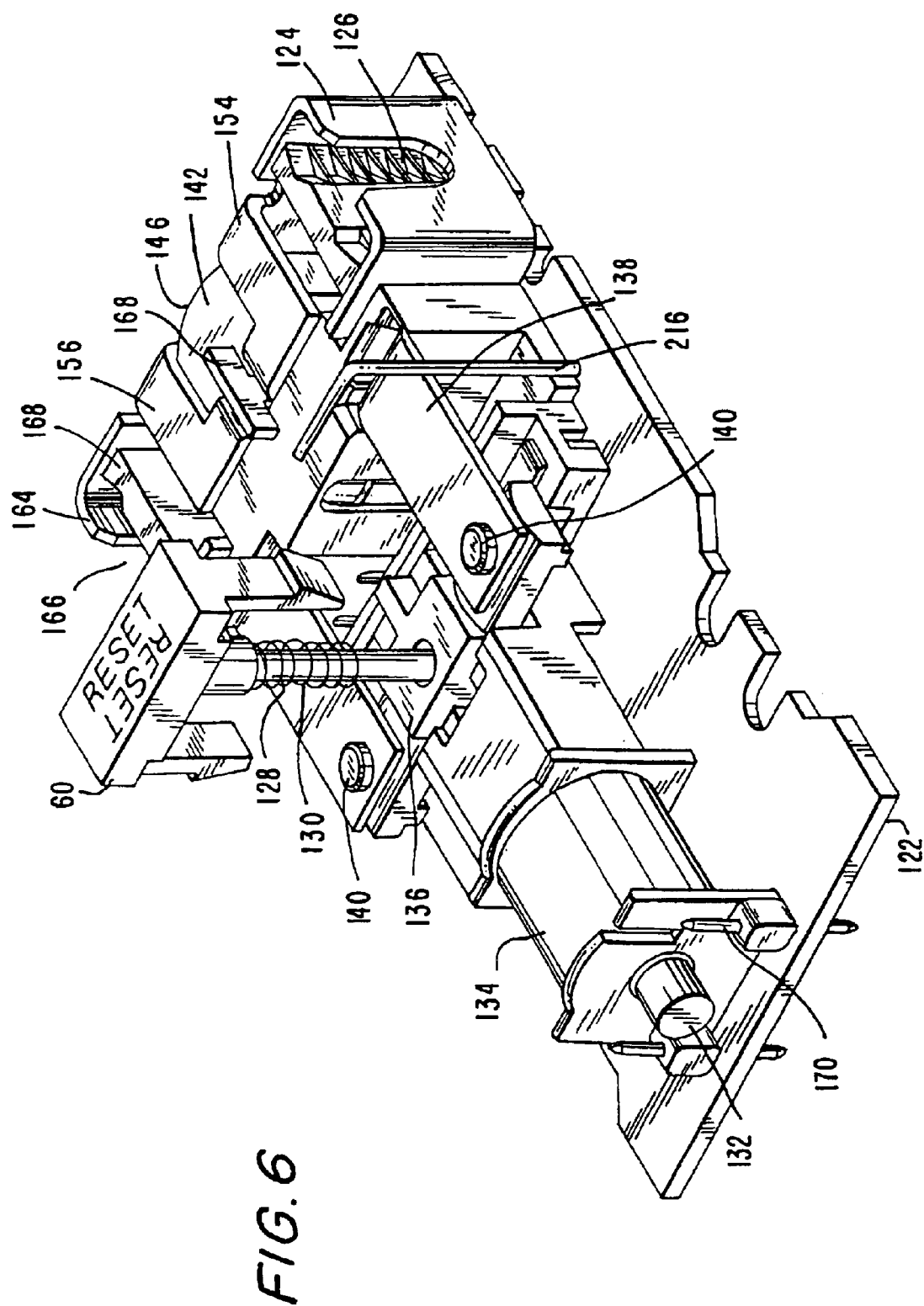
FIG. 6 is a perspective view of the printed circuit board and reset assemblies of the device of FIG. 1.
Figure 7:
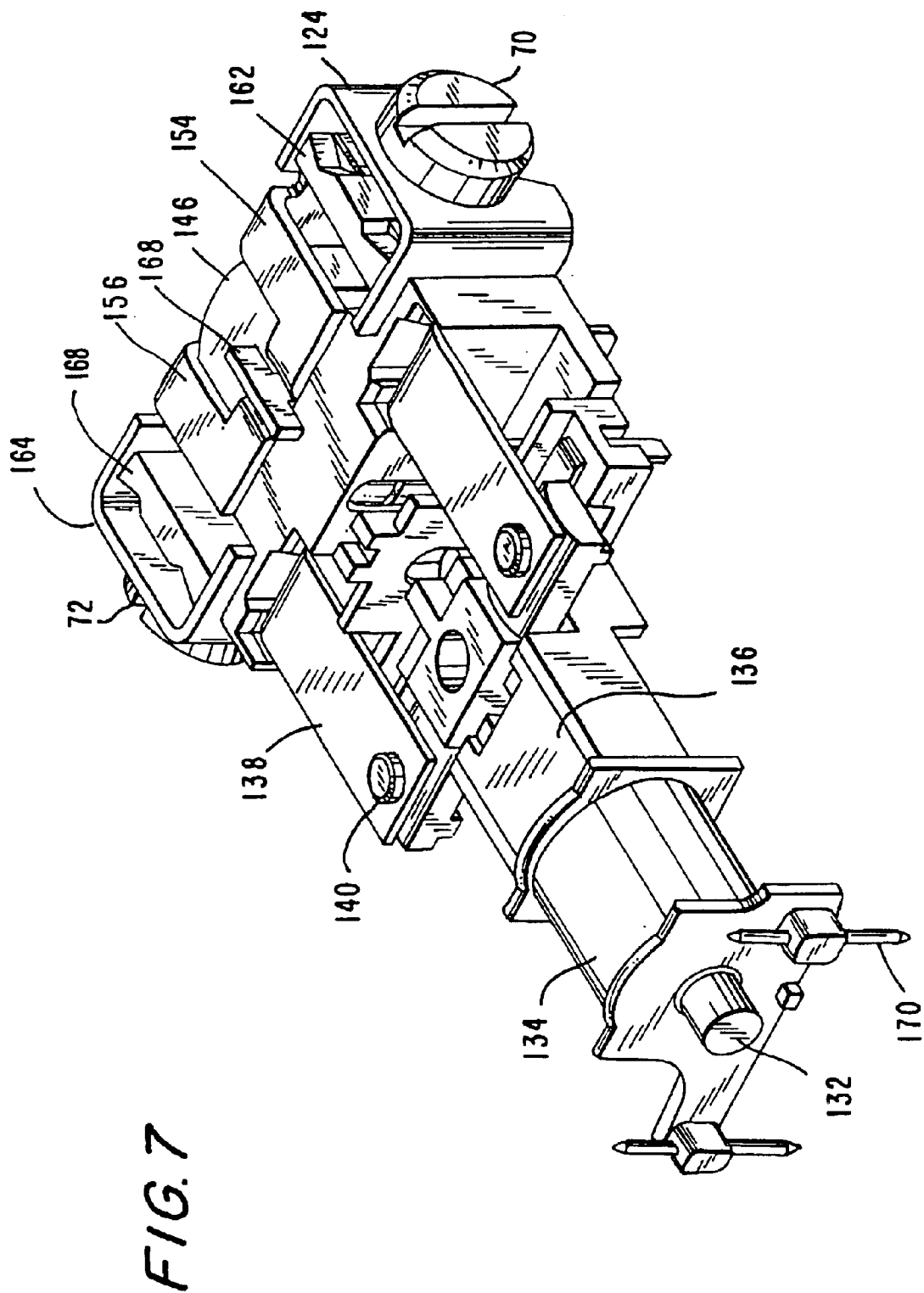
FIG. 7 is a perspective view of the devices of FIG. 6 with the reset lever and PC board removed.
Figure 11:
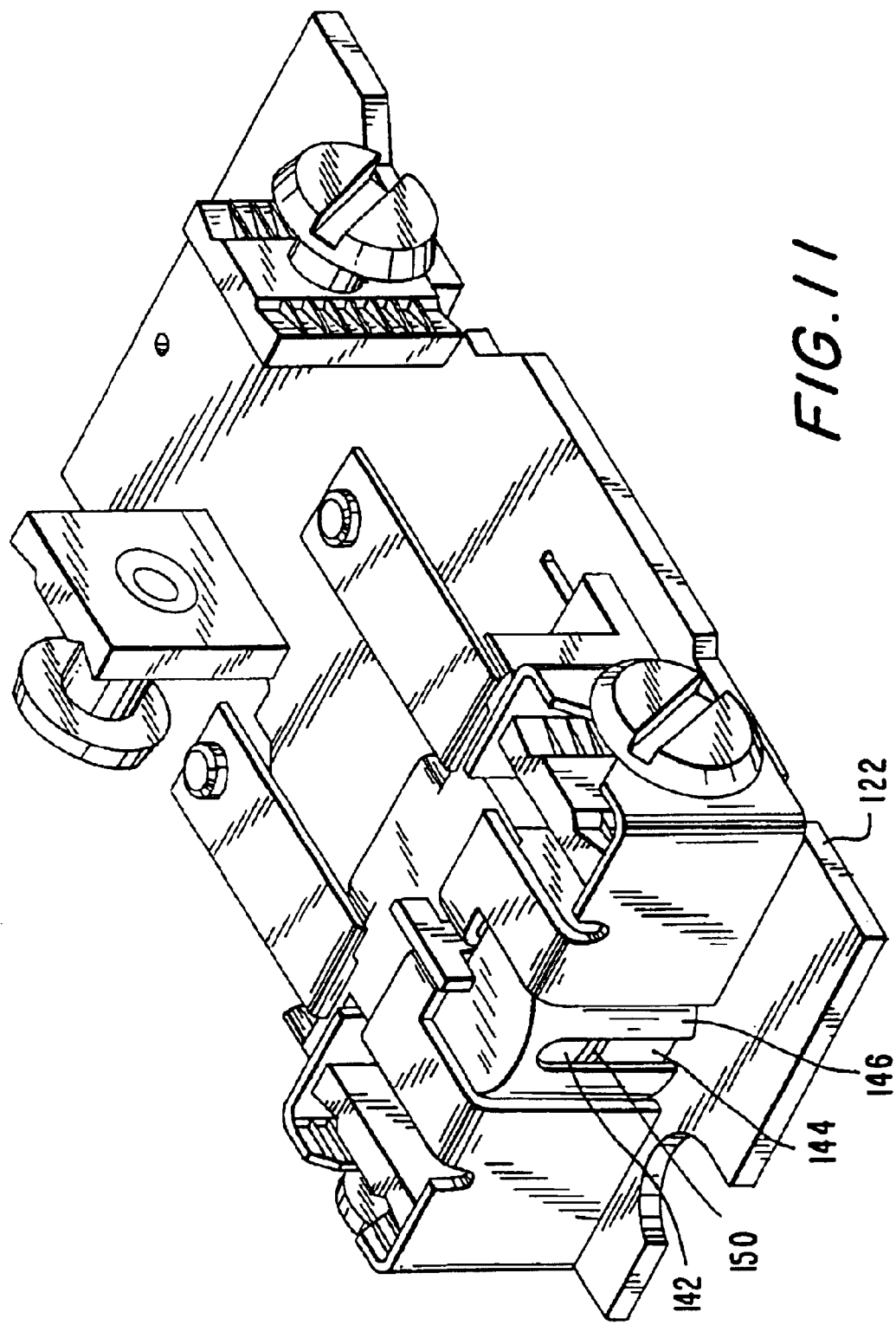
FIG. 11 is a perspective view showing the transformers mounted on the printed circuit board of the device of FIG. 1.
Figure 12:
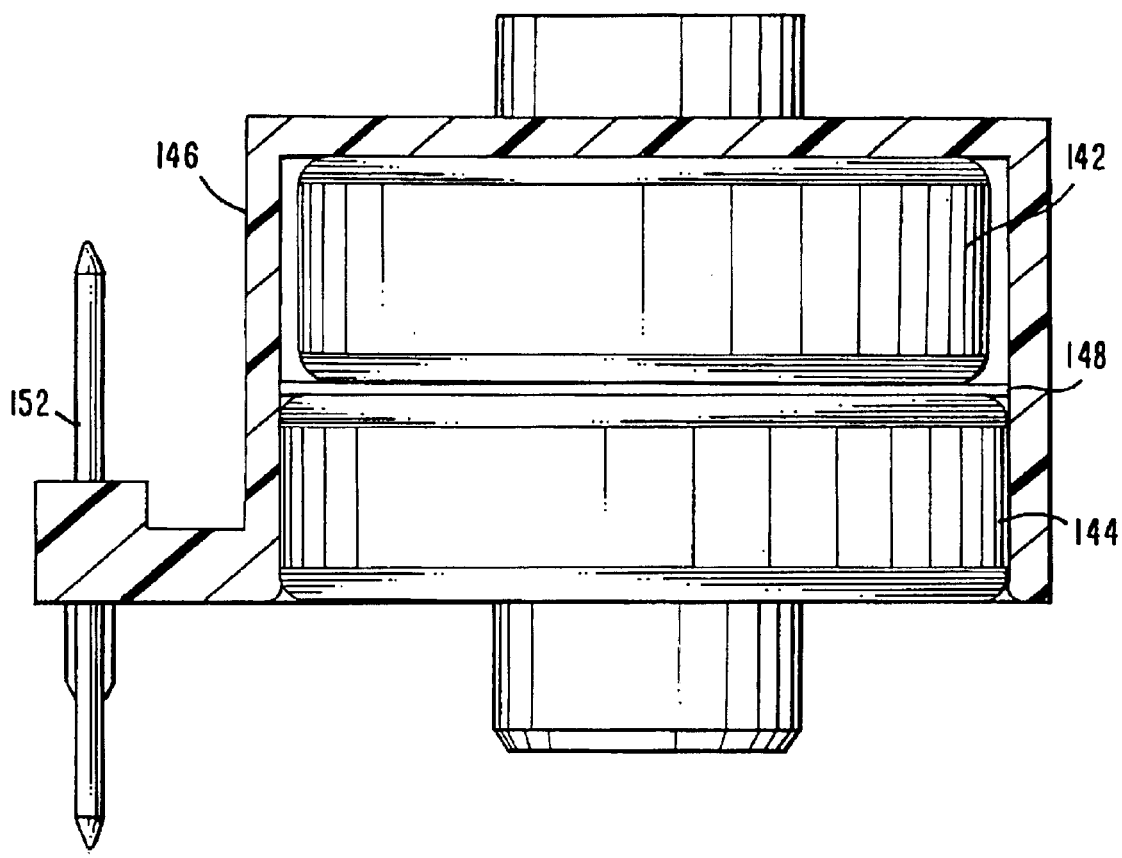
FIG. 12 is a side elevational view partly in section of the transformer bracket assembly of FIG. 11.

Referring now to FIG. 6 the PCB 122 assembly and the reset assembly are shown with the middle housing 34 removed. The reset assembly comprises a reset button 60, a reset lever 128 and a reset spring 130 and a latch pin to be described below with respect to FIGS. 16 to 20. A plunger 132 is positioned in the passageway of a solenoid coil 134. The plunger 132 is shown in its reset position extending partially out of the passageway of solenoid coil 134. When the solenoid coil 134 is operated by the circuits on the PCB 122 the plunger 132 is drawn further into solenoid coil 134. The plunger 132 controls the position of the latch plate to be described with reference to FIG. 10. The latch plate in cooperation the latch pin and reset spring 130 move the lifter 136 upwardly against the movable contact arms 138 to close the main movable contacts 140 to the main fixed contacts 108, 112 on the underside of interned tabs 106, 110, respectively. The movable contact arms 138 are biased away from their associated interned tabs 106, 110 and when the latch pin has been released push the lifter 136 and latch plate downwardly to move the movable contacts 140 away from their associated fixed contacts 108, 112. Also mounted on the PCB 122 is a neutral transformer 142 and a differential transformer 144. Only the neutral transformer 142 is shown in FIG. 6. Both transformers and the transformer bracket assembly 146 are shown in FIG. 12. Neutral transformer 142 is stacked upon differential transformer 144 with a fiber washer 148 therebetween. The bracket assembly 146 substantially surrounds the transformers 142, 144 except for a slot 150 as shown in FIG. 11 and slots into which conductors are placed. The leads for the windings of the transformers are brought out to four transformer pins 152 to which may be coupled the line and load conductors. One of the transformers will sense the current going to the load from the source and the other will sense the current from the load back to the source. Any difference in current through these transformers is an indication that there is a fault in the circuit wiring. A device which can measure small differences in current and supply a fault signal is an integrated circuit available from many sources, for example, type number LM1851 from National Semiconductor or type number MC3426 from Motorola. This IC is located on PCB 122. The line neutral terminal 154 and the line phase terminal 156 have arms 158, 160 (see FIG. 9) which extend through the slots in the top of transformer bracket assembly 146. As shown in FIG. 7, terminal screw 70 extends through slot 126 of tab 124 that is part of line neutral terminal 154 and into a threaded aperture in nut 162 to thus connect the line neutral conductor (not shown) to the two transformers. The arms 158, 160 act as one turn windings for the transformers 142 and 144. The line phase conductor (not shown) is connected via terminal screw 72 to tab 164 which extends through a slot 166 in tab 164 into the threaded aperture of a nut 168. Tab 162 is part of the line phase terminal 156. An insulator 168 extends between the arms 158, 160 to prevent shorting between them. The solenoid coil 134 is connected to two bobbin pins 170 to permit connection to PCB 122. FIG. 7 is similar to FIG. 6 but omits the PCB 122, the reset button 60, the reset lever 128 and the reset spring 130.

Figure 8:
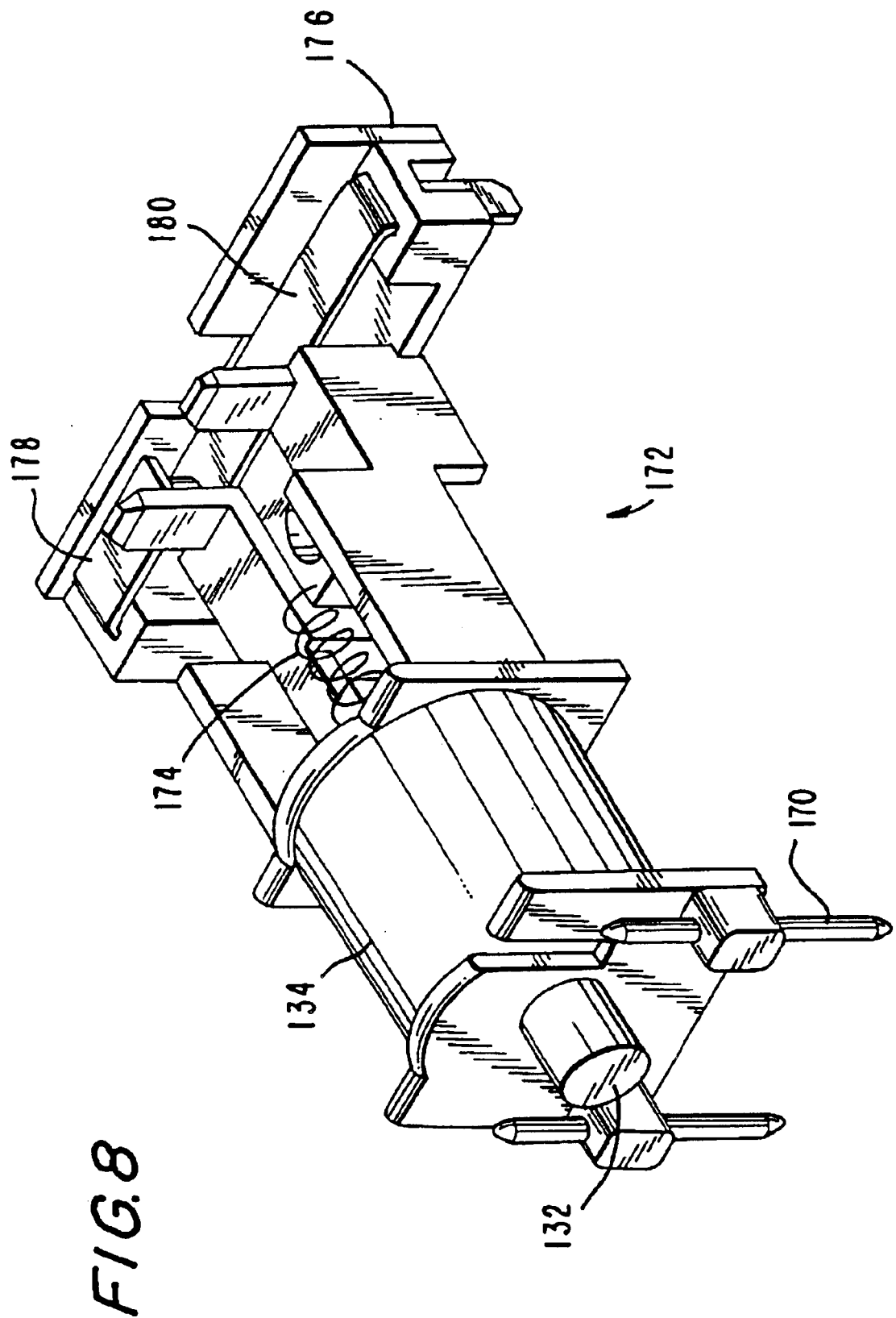
FIG. 8 is a perspective view of the bobbin assembly of the device of FIG. 1.

FIG. 8 shows the bobbin assembly 172 having solenoid coil 134 connected to bobbin pins 170 and containing plunger 132 in its passageway. A chamber 174 receives the lifter 136 and supports the lifter 136 when in its low position. A cross member 176 supports the auxiliary switch made up of auxiliary fixed contact arm 178 and auxiliary movable contact arm 180. The auxiliary switch when auxiliary fixed contact 186 and auxiliary movable contact 188 are engaged provides power to various components on the PCB 122. The auxiliary switch, when auxiliary fixed contact 186 and auxiliary movable contact 188 are not engaged cut-off the power to the components on PCB 122 and prevent possible damage to the PCB 122 components. For example, if the signal to the solenoid coil 134 were repeatedly applied while the main contacts are open there is a chance to burn out the solenoid coil 134. The auxiliary movable contact arm 180 is biased towards auxiliary fixed contact arm 178 and will engage it unless forced to open the contacts.

Figure 9:
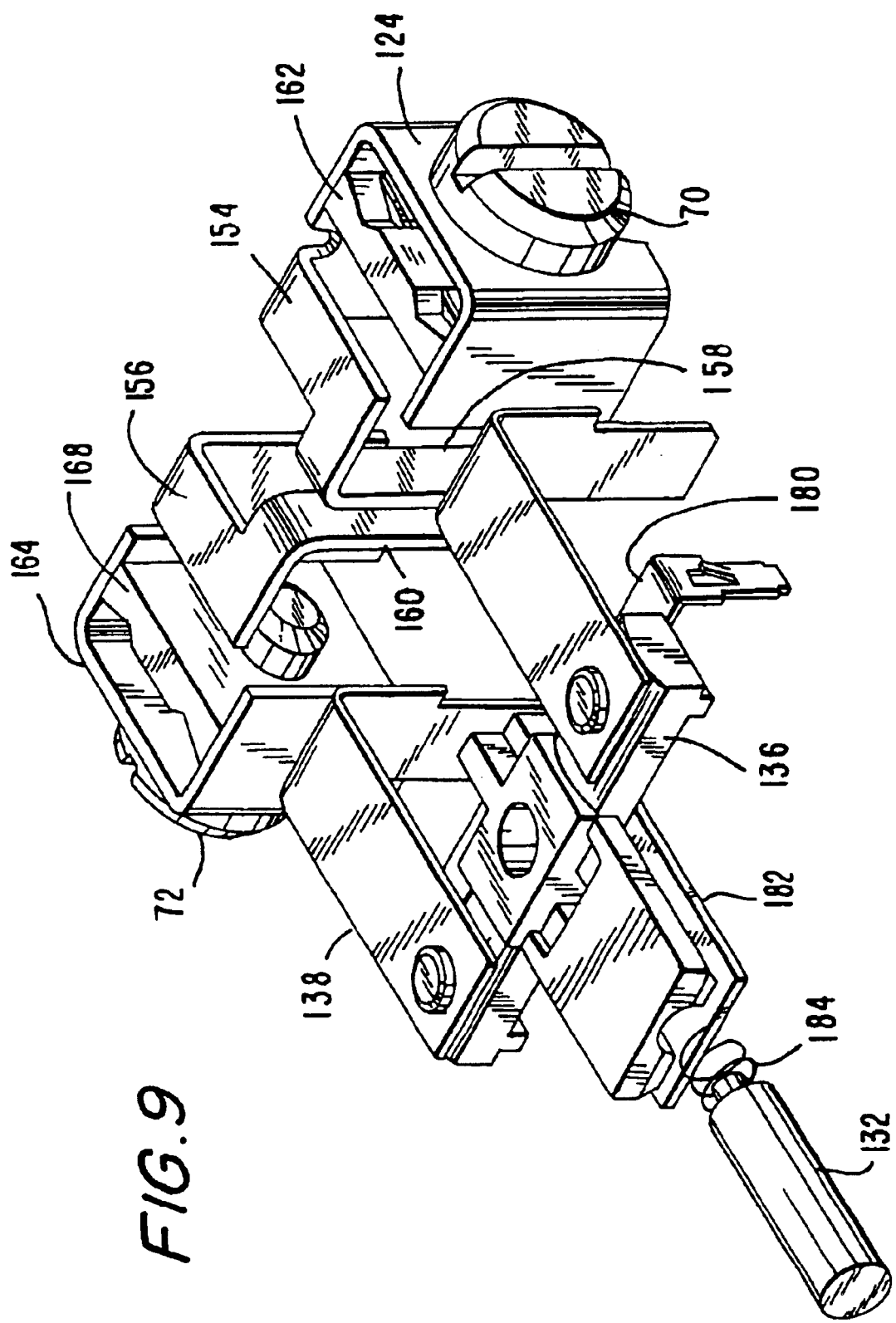
FIG. 9 is a perspective view of the main movable contacts of the device of FIG. 1.

FIG. 9 shows the lifter 136 in contact with the movable contact arms 138 and positioned by the latch plate 182 which in turn is controlled by the plunger 132 and the plunger reset spring 184. The lifter 136 and latch plate 182 positions are dependent upon the reset lever 128 position as will be described below. The lifter 136 also controls the auxiliary movable contact arm 180. When the lifter 136 in its low position, the auxiliary movable contact 188 is moved away from contact with the auxiliary fixed contact 188 (not shown). A latch plate return spring (not shown) resets the latch plate once the plunger 132 is reset as will be set out with respect to FIG. 10.

Figure 10:
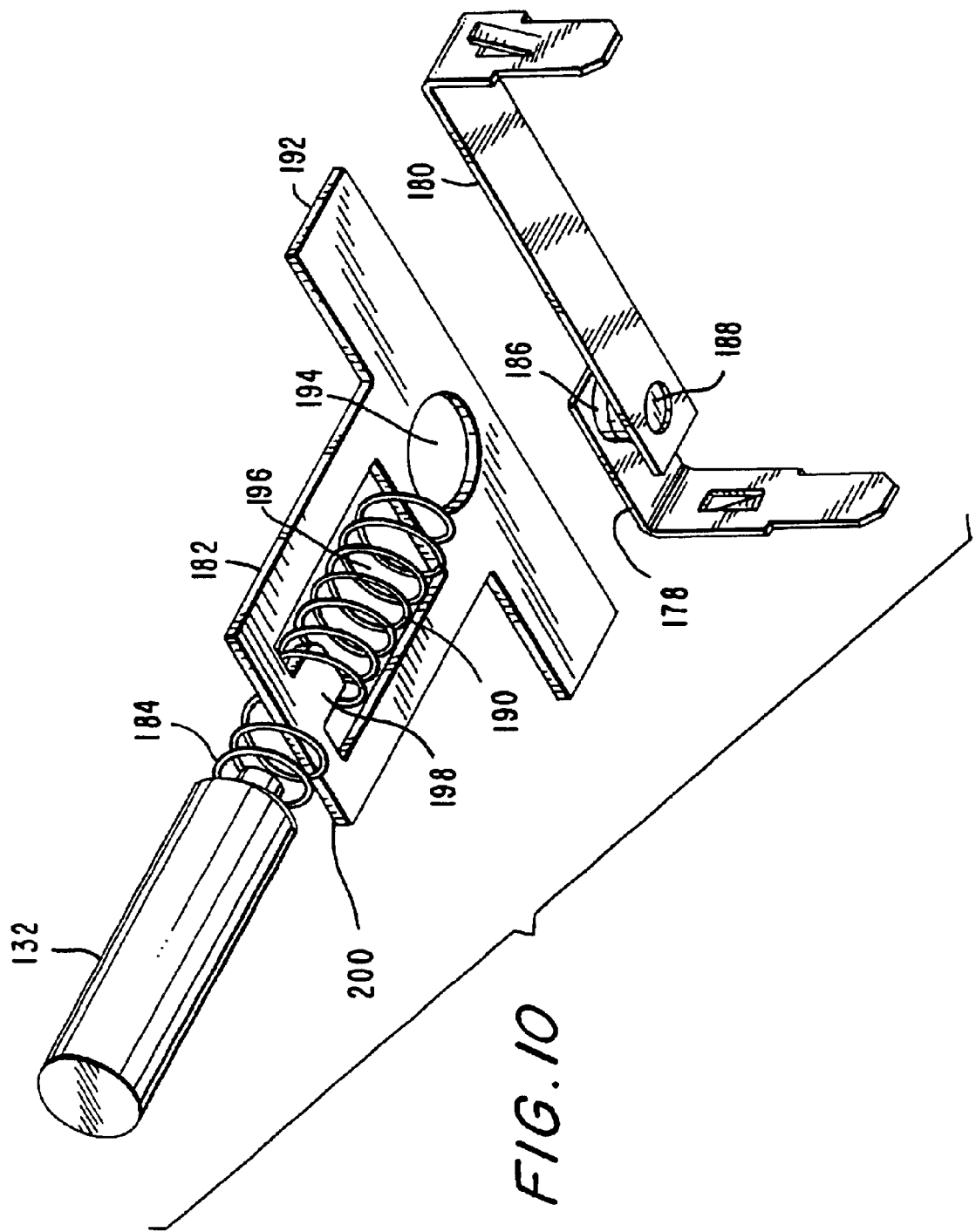
FIG. 10 is a bottom perspective view of the plunger, latch plate and auxiliary contacts of the device of FIG. 1.

In FIG. 10 there is shown the latch plate 182, the plunger 132 and the auxiliary fixed arm 178 with auxiliary fixed contact 186 and the auxiliary movable arm 180 with auxiliary movable contact 188. Plunger reset spring 184 is anchored on the back edge 200 of latch plate 182 and the tab 198 extending into the rectangular opening 196. When the plunger 132 is moved to the right in FIG. 10 as a result of the activation of solenoid coil 134 the plunger reset spring 184 is compressed and expands to return the plunger 132 to its initial position partially out of the solenoid coil 134 as shown in FIG. 6 when the solenoid coil 134 is deactivated. Latch plate return spring 190 is connected between lifter 136 and tab 198 and is compressed by the movement of latch plate 182 to the right in FIG. 10 due to movement of plunger 132 to the right as well. When the plunger 132 is withdrawn, the latch plate return spring 190 expands to return the latch plate 182 to the left in FIG. 10. The arms 192 support arms of lifter 136. A central aperture 194 is oval in shape with its longer axis extending along a central longitudinal axis of latch plate 182. At the center of aperture 194, the aperture 194 is large enough for a latch pin (not shown) to pass through aperture 194 and move without engaging the lifter 136. At one of the smaller ends the latch pin is held by the latch plate 182 and causes the lifter 136 to move with the latch pin as will be described below. The auxiliary movable arm 180 is biased upwardly so that it brings auxiliary movable contact 188 into contact with auxiliary fixed contact 186 on auxiliary fixed arm 178. As will be described below an arm of the lifter 136 will engage the auxiliary movable arm 180 to push it downwardly in FIG. 10 to separate the auxiliary movable contact 188 from the auxiliary fixed contact 186 and open the auxiliary circuit.

Figure 13:
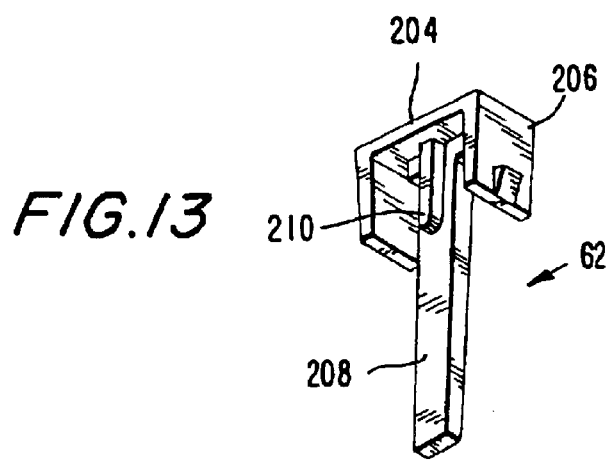
FIG. 13 is a perspective view of the test lever and button of the device of FIG. 1.
Figure 14:
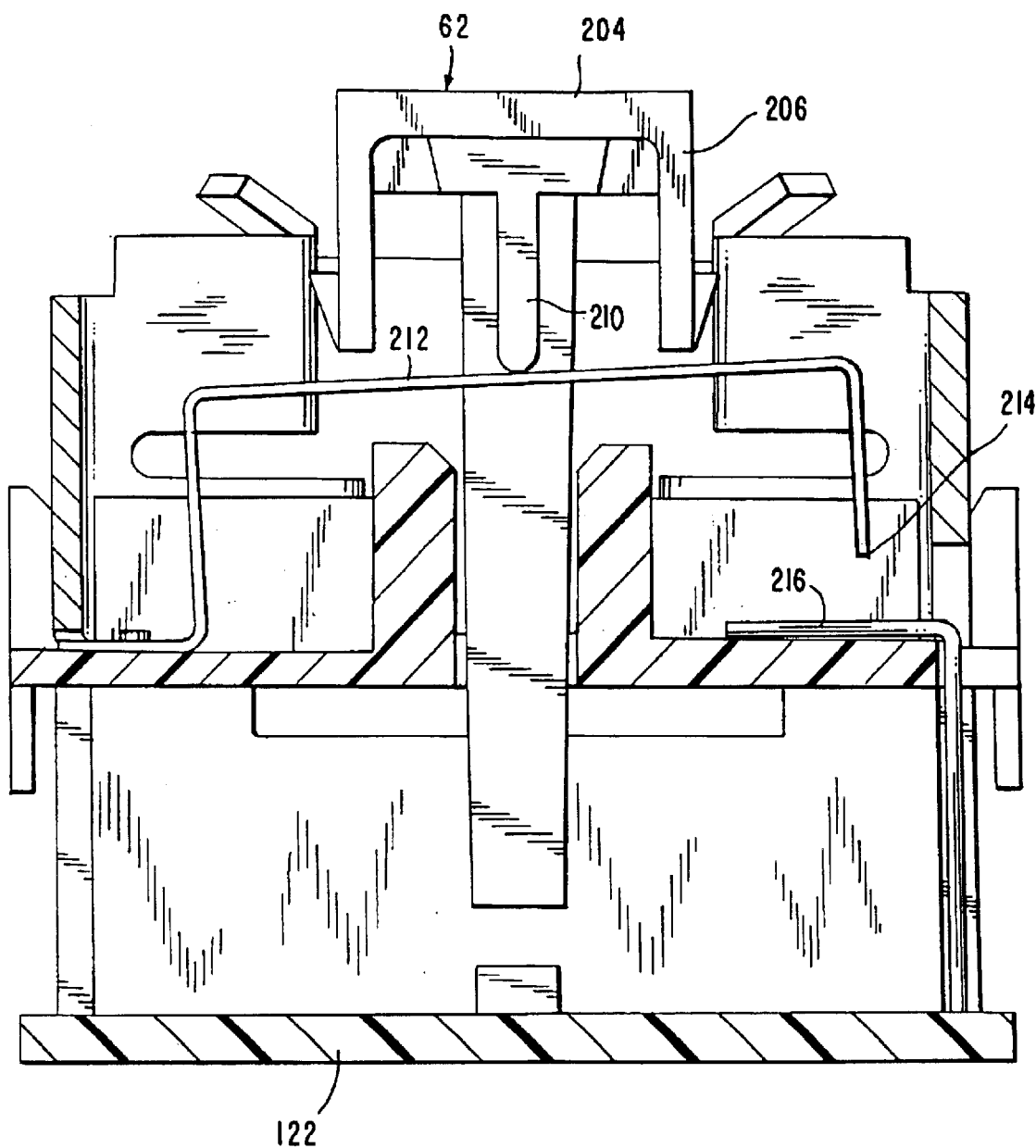
FIG. 14 is front elevational view of the test lever, test button, test arm and test pin in the open position.
Figure 15:
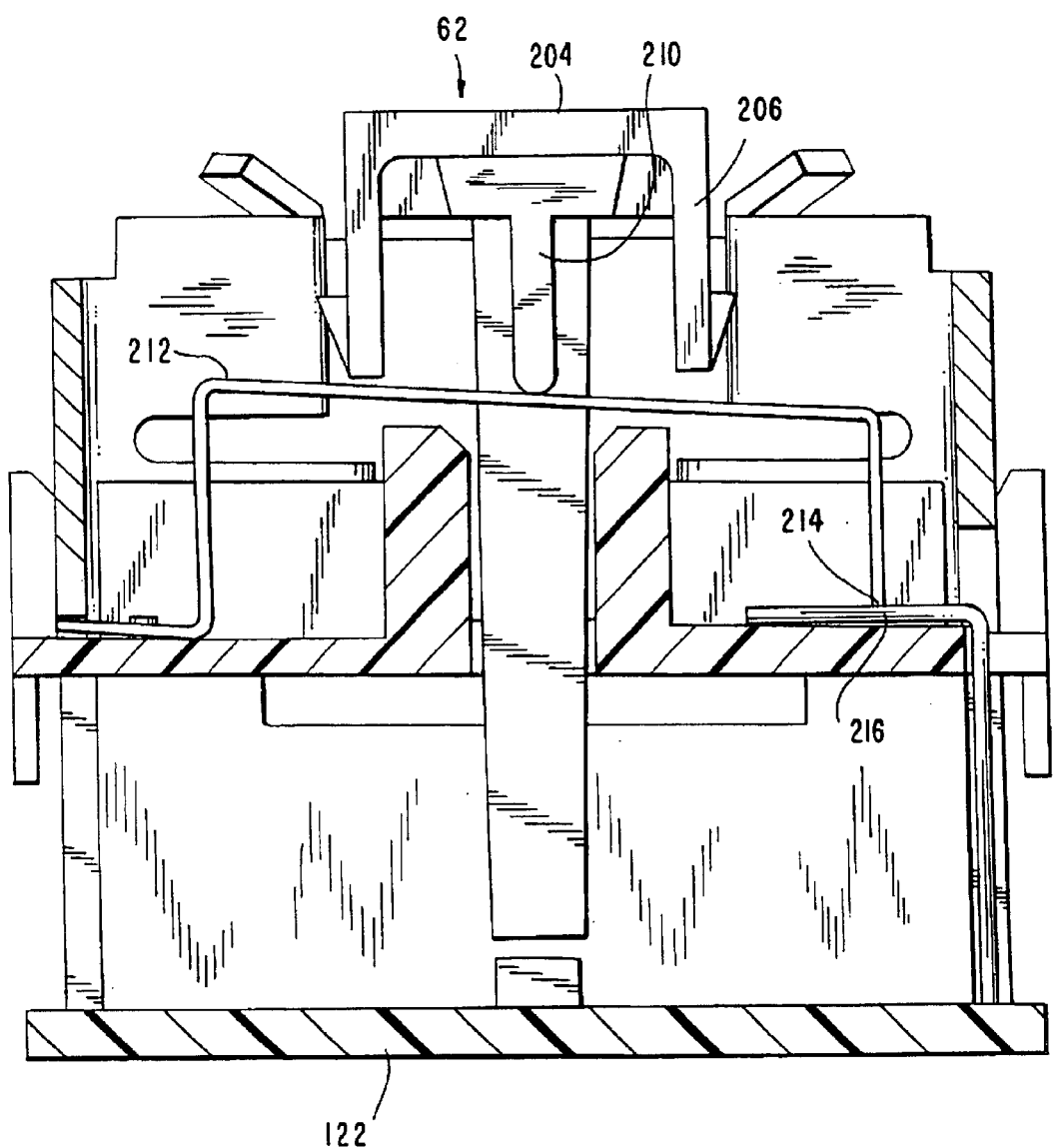
FIG. 15 is a front elevational view of the components shown in FIG. 14 in the closed, test position.

Turning now to FIGS. 13, 14 and 15 the test button 62 is shown and its operation described. Test button 62 has a top member 204 from which extend side members 206. Also extending from top member 204 is a central lever 208 which contains a cam 210. The lever 208 extends through square opening 82 in mounting strap 40. The cam 210, when the test button 62 is depressed, engages a test arm 212 and moves its free end 214 into contact with test pin 216. The position of the test pin 216 is shown in FIG. 6. The test pin 216 is coupled to a small resistor and a lead which extends through one of the transformers 142, 144 to produce an unbalance in the power lines and cause the integrated circuit LM1851 to produce a signal to operate the solenoid 134 and thus simulate a fault. The test button return spring (not shown) returns the test button 62 to its initial position. FIG. 14 shows the reset position of test button 64 with cam 210 not depressing test arm 212 and the free end 214 separated from test pin 216. When the test button 62 is depressed as shown in FIG. 15, the cam 210 forces the free end 214 of test arm 212 downwardly into contact with test pin 216 to cause a simulated fault and operate the GFCI 30 to determine that the GFCI 30 is working properly. When released test button 62 returns to its reset position as shown in FIG. 14.

Figures 16, 21:
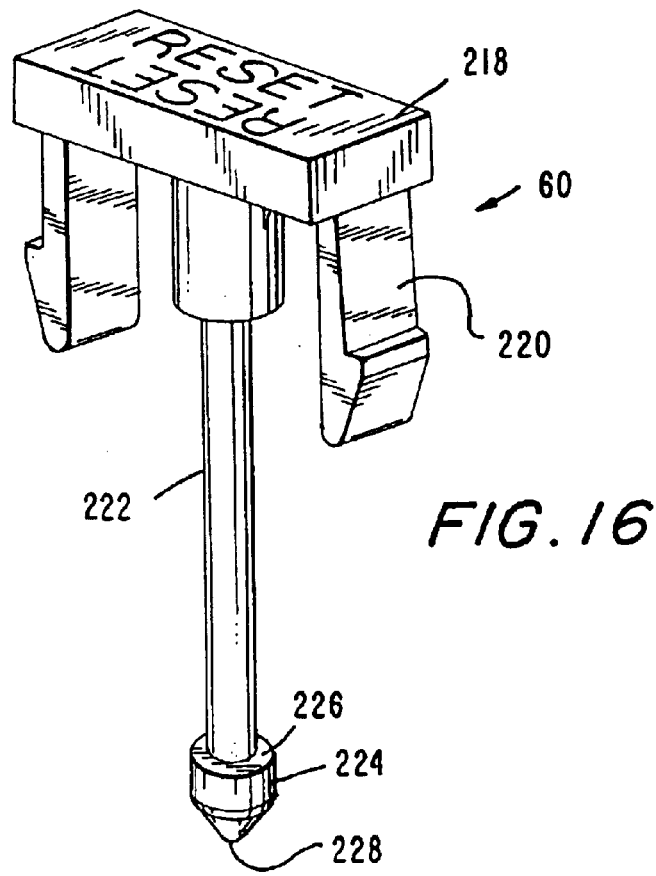
FIG. 16 is a perspective view of the reset lever and reset button of the device of FIG. 1.
FIG. 21 is a table to show the relationships between the status of the GFCI and associated circuits and the color, speed of blinking and the presence or absence of an audible signal.
Figure 17:
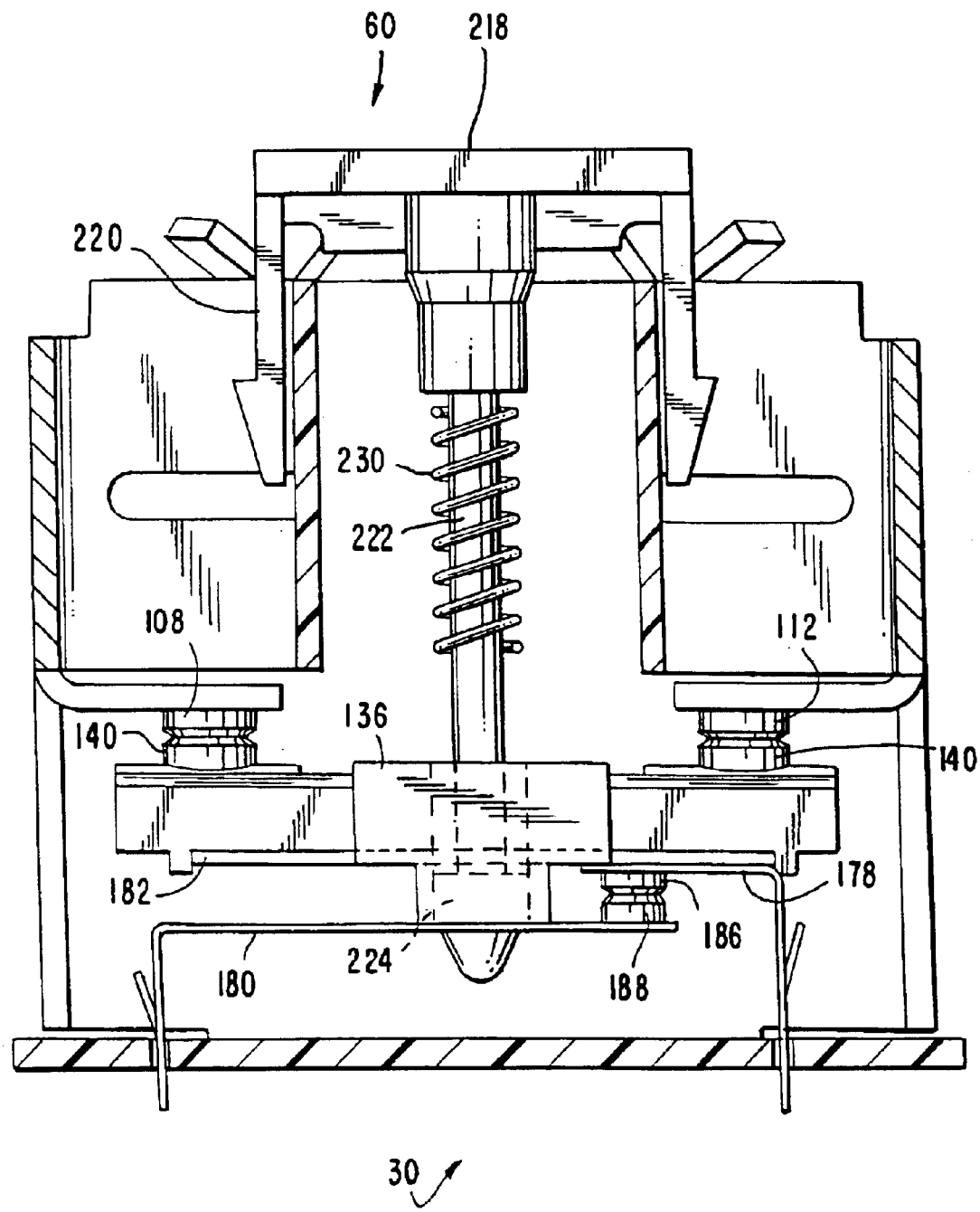
FIG. 17 is a front elevational view of the reset lever reset button, main contacts and auxiliary contacts in the closed or reset condition.
Figure 18:
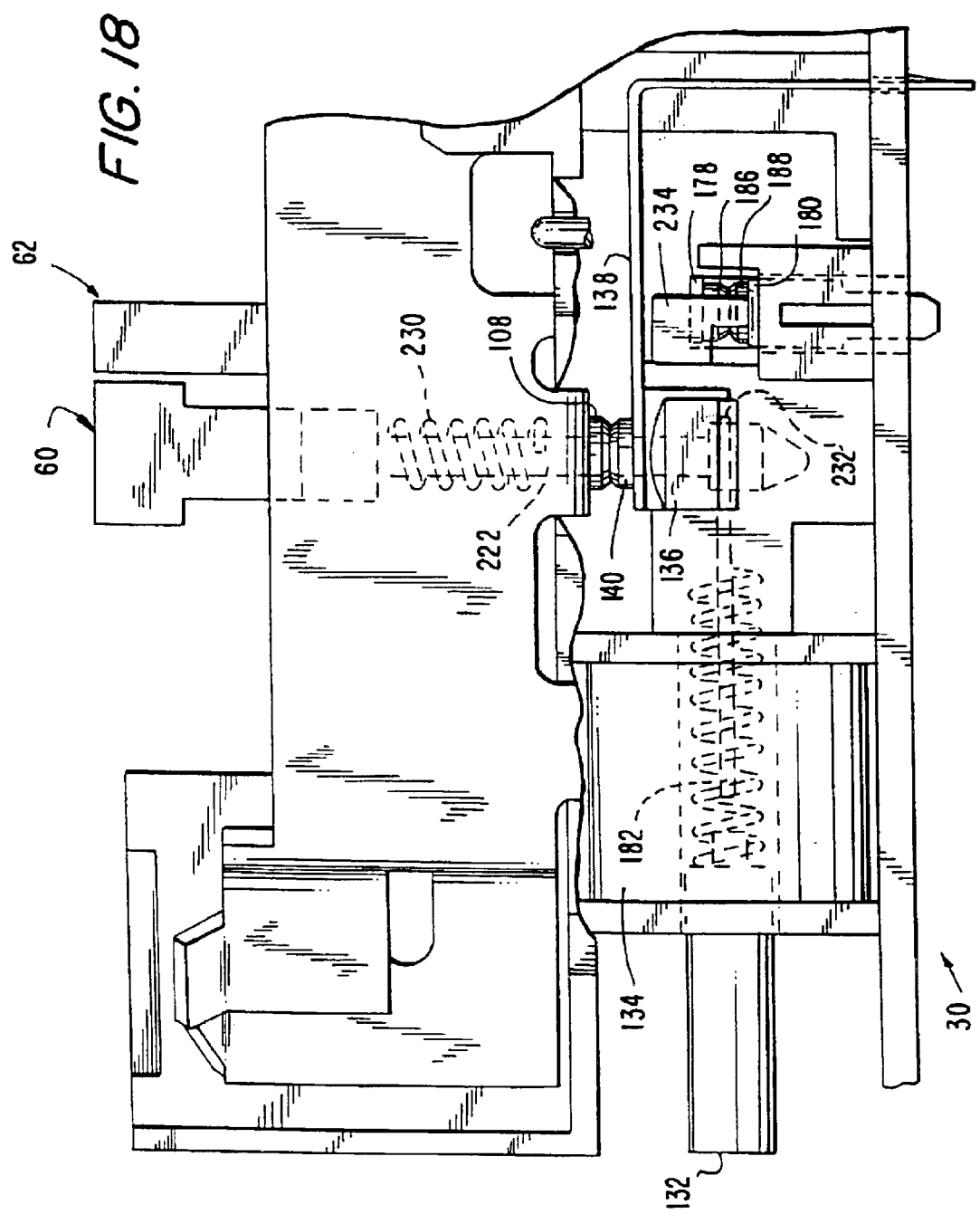
FIG. 18 is a side elevational view of the device according to FIG. 17.

The reset button 60 is shown in FIG. 16. Reset button 60 has a top member 218 from which depend side members 220. Also extending from top member 218 is a latch lever 222 which ends in a latch pin 224. Latch pin 224 is generally pointed at its free end 228. The diameter of latch pin 224 is greater than the diameter of the latch lever 222 resulting in a latch shoulder 226. A reset spring 230 surrounds latch lever 222 as shown in FIG. 17. FIGS. 17 and 18 show the GFCI 30 in its reset position. FIG. 17 is a rear view while FIG. 18 is a side elevational review. The surrounding structure is shown in light line to permit the switching components of GFCI 30 to stand out. In FIG. 18 the plunger 132 extends out of the solenoid coil 134 and the latch plate 182 is drawn to the left of the figure so that a smaller end of the oval aperture 194 engages the latch lever 222. The latch pin 224 cannot be drawn through oval aperture 194. The leading end 232 of latch plate 182 rests upon the latch shoulder 226 and also is positioned under lifter 136. The reset spring 230 urges the latch lever 222 upwardly causing the lifter 136 to also move upwardly. This upward movement causes the movable contact arms 138 to also move upwardly bringing movable contacts 140 into contact with fixed contacts 108, 112 (see FIG. 17). The extension 234 of lifter 136 moves away from its contact with auxiliary movable arm 180 and the upwardly braised auxiliary movable arm 180 causes its auxiliary movable contact 188 to engage auxiliary fixed contact 186 on auxiliary fixed arm 178 and thus supply power to the PCB.

Figure 19:
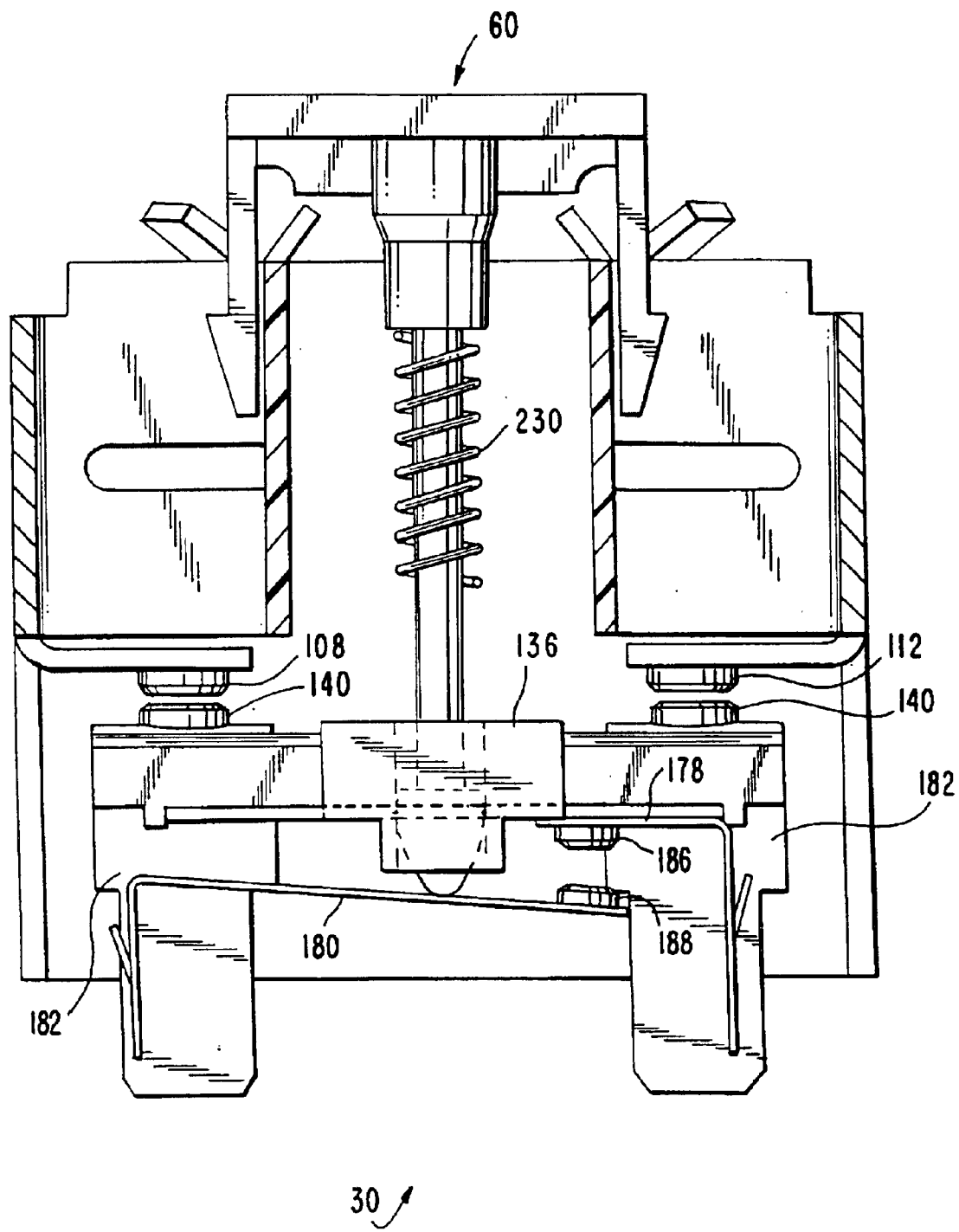
FIG. 19 is a front elevational view of the components of FIG. 17 in the tripped condition.

In response to an internal or external fault or in response to a test employing test button 62, the GFCI 30, if working properly will go to a trip state shown in FIGS. 19 and 20 wherein both the main circuits and the auxiliary circuit will be opened. The presence of the trip condition is signaled by the circuits of the PCB. A signal will be supplied to the solenoid coil 134 which draws the plunger 132 further into solenoid coil 134. Plunger 132 causes the latch plate 182 to move to the right in FIG. 20 and place the central portion of oval aperture 194 over latch pin 224. In this position leading end 232 of the latch plate 182 not longer engages the latch shoulder 226 and the latch lever 222 is free to move through the oval aperture 194. As a result there is nothing to hold the movable contacts 140 on movable contact arms 138 in contact with fixed contacts 108, 112 on the fixed arms 106, 110, respectively. The movable contact arms 138, biased downwardly bear upon the lifter 136 moving it downwardly separating contacts 108, 112 and 140. The extension 234 bears against auxiliary movable arm 180 and causes its downward movement separating the auxiliary movable contact 188 from the auxiliary fixed contact 186 and opening the auxiliary circuit to supply power to the circuits on the PCB. The reset button 60 pops up as a result of the action of reset spring 230 to indicate that the GFCI 30 needs to be reset.

In addition to the pop-up of the reset button 60, the GFCI has a dual color indicator lamp means 64 and a piezo resonator 236 driven by an oscillator on the PCB (not shown) to produce an audible output. By selecting the oscillator frequency of 3.0 KHZ+/−20% and controlling the time of operation of the oscillator, the audible signal shall be active for 0.10 second and inactive for 2 seconds. FIG. 21 shows the various combinations of light color, light flashing speed and beeper sound which can be produced to show various states of the GFCI 30. A supervisory signal that indicates that the GFCI 30 is working is provided for the first 25 days of the GFCI 30 cycle. It is recommended that the GFCI 30 be tested and reset every 30 days to ensure that the GFCI 30, is working properly.

However, for the most part this instruction is disregarded by users. To encourage the testing of the GFCI 30 the various lights and beeper approach is employed. At the end of 25 days the slow flashing green light which signaled the device as workings changes to a faster blink. The supervisory or slow blink is 0.10 seconds "on" and 15 seconds "off". The faster blink is 0.10 seconds on and 0.9 seconds off. This fast blink extends for five days at which time both filaments of the indicator lamp means 64 are energized to produce an amber light which is blinked at the fast blink rate. If the power comes on reset the amber light will also blink at the fast rate until the supervisory condition is reached. The time periods are established by a counter and a clock generator on the PCB. If an external fault is detected the amber light is lit and the audible signal is generated. The GFCI 30 will need to be reset. If the fault is in the GFCI 30 itself, for example the solenoid coil 134 is burned out, then the red filament of the indicator lamp means 64 is activated and the audible signal is generated. The GFCI 30 will have to be replaced if the fault is in the GFCI 30.

A circuit interrupting device having a reset lockout device and a separate user load break point may be desirable.

Figure 22:
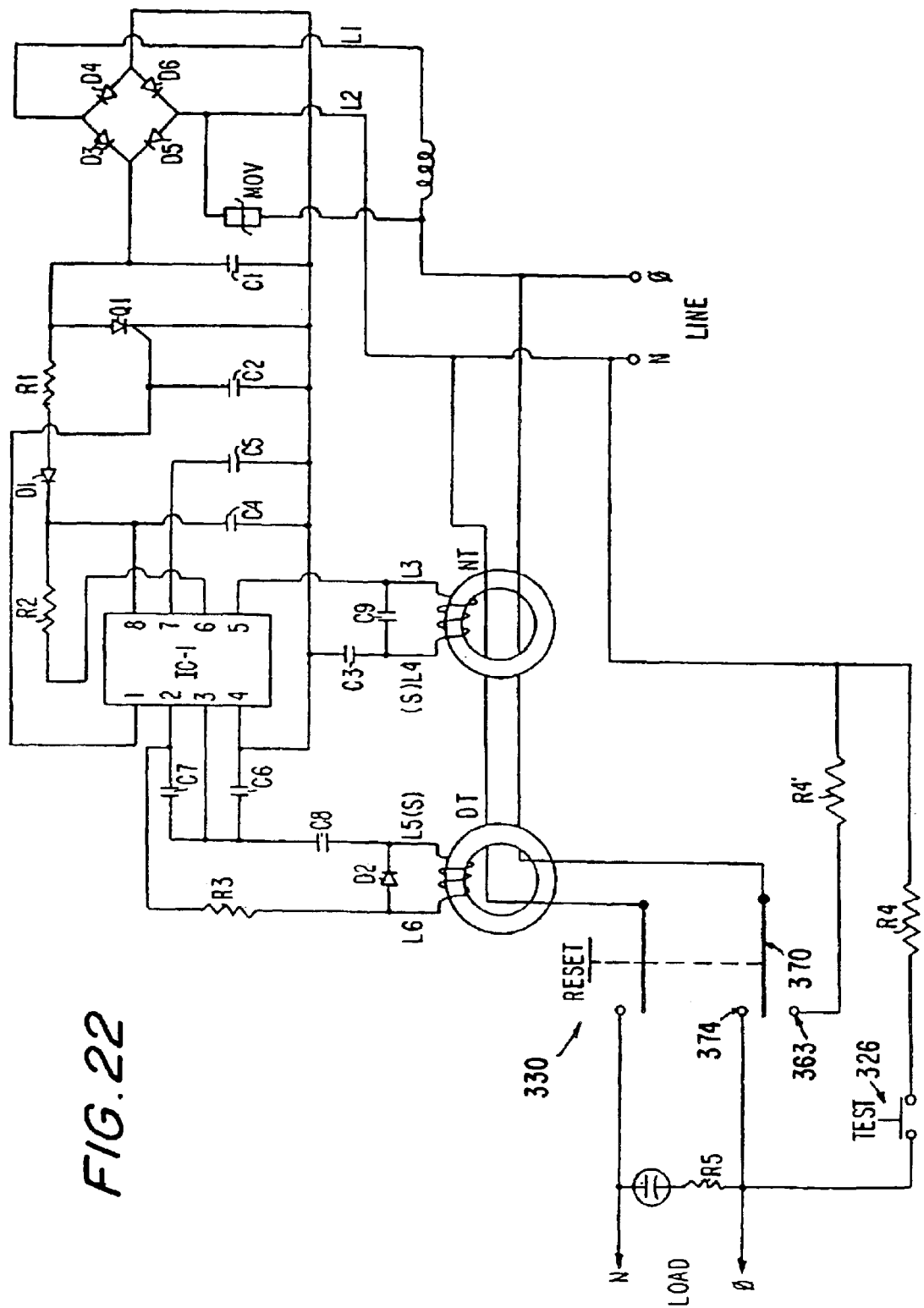
FIG. 22 is a schematic diagrams of a GFCI according to an embodiment of the present invention.

Referring to FIG. 22, a schematic diagrams of a GFCI according to an embodiment of the present invention is shown having a reset lockout mechanism using an electrical test through R4'.

Figure 23:
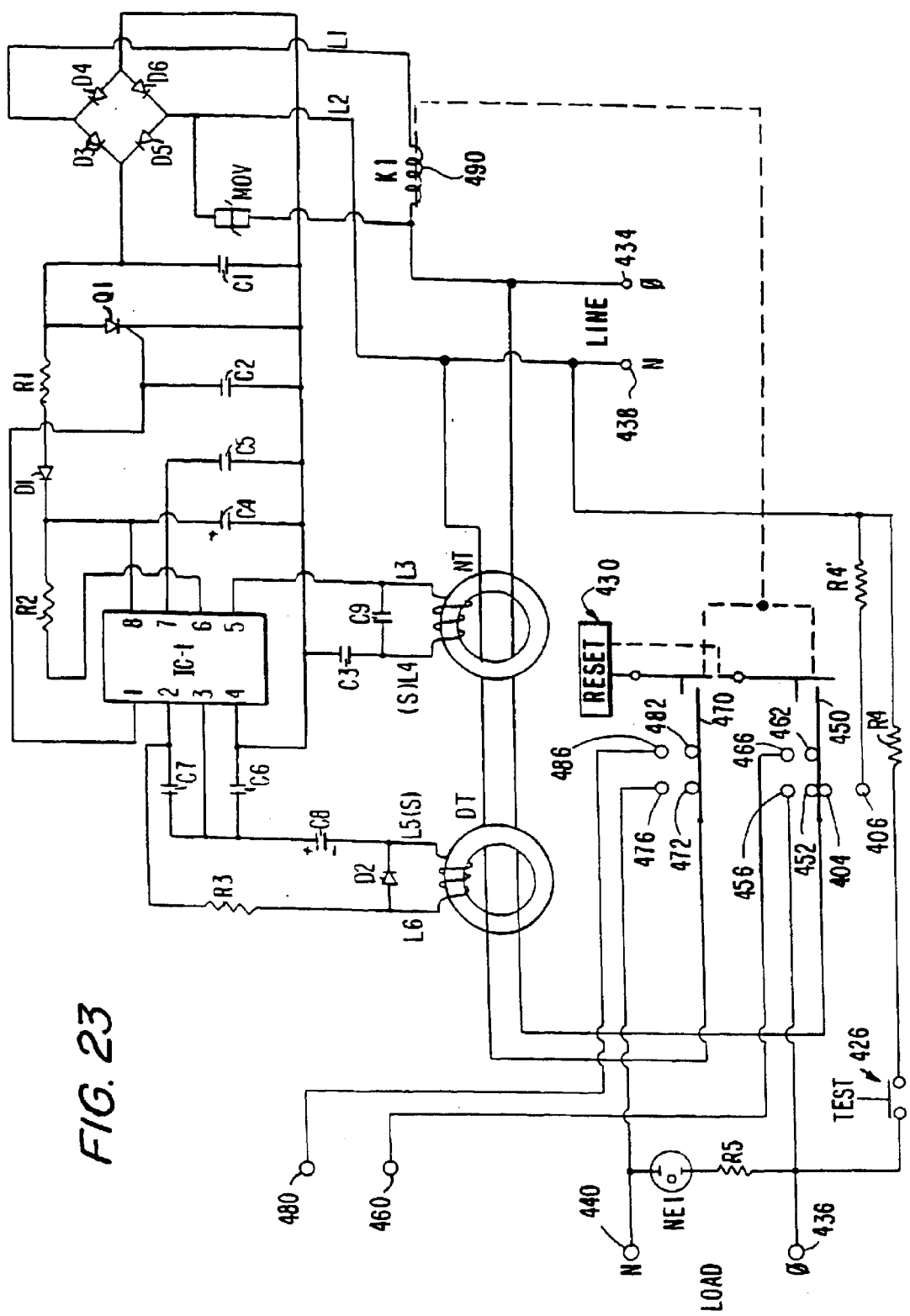
FIG. 23 is a schematic diagrams of a GFCI according to an embodiment of the present invention having a bridge circuit.

Referring to FIG. 23, a schematic diagrams of a GFCI according to an embodiment of the present invention is shown incorporating a bridge circuit with reset lockout. As can be appreciated, the bridge circuit can be implemented in the device of FIGS. 1–21 by separately isolating the load side and user load from the line side for each of the phase and neutral lines. For example, bars 98 and 100 need to be modified to isolate tabs 114 and 118 respectfully from tab 102 and its opposing counterpart. An extra contact at 106, 108 would be utilized.

Figure 24:
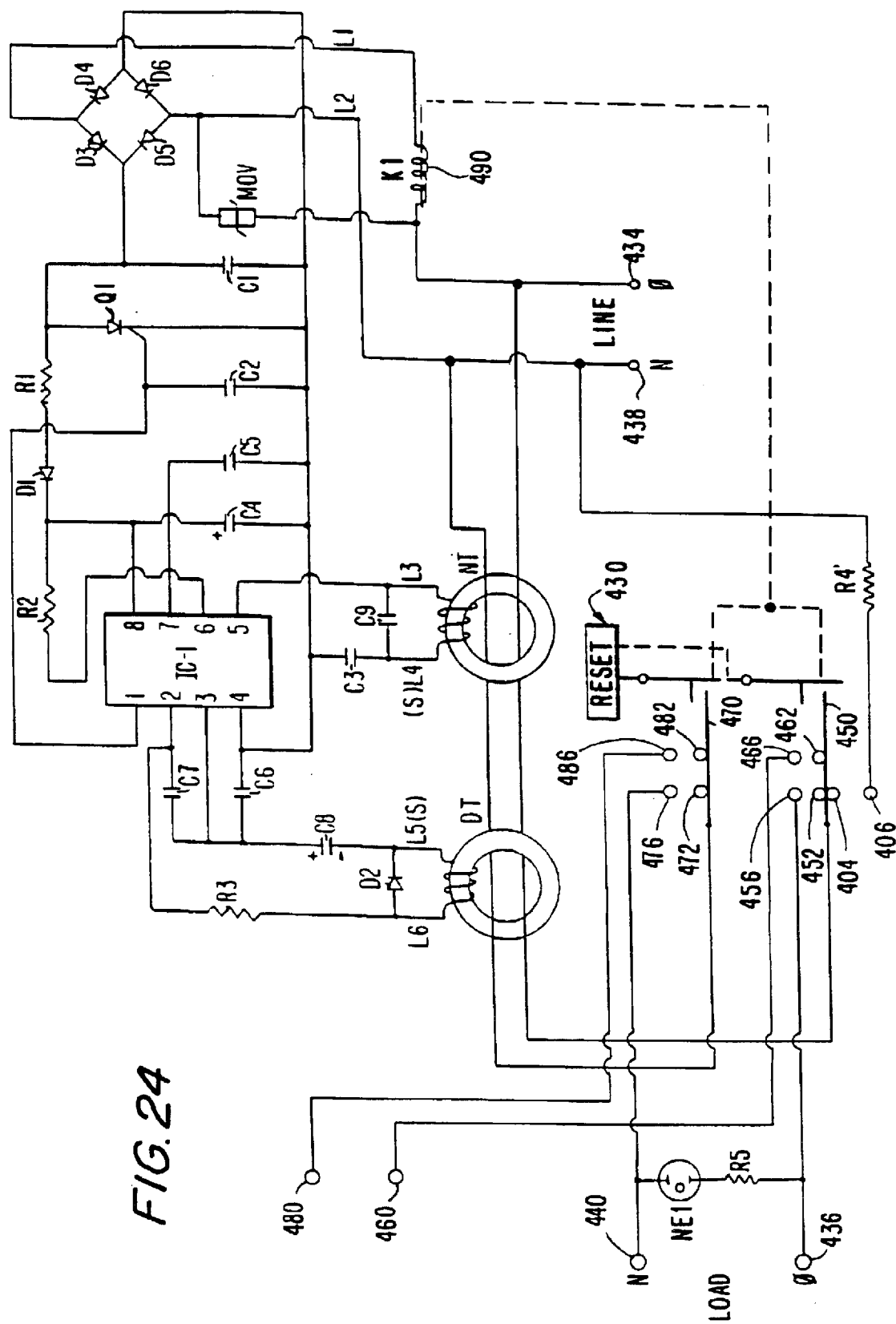
FIG. 24 is a schematic diagrams of a GFCI according to an embodiment of the present invention having a bridge circuit an independent trip mechanism.

Referring to FIG. 24, a schematic diagrams of a GFCI according to an embodiment of the present invention having a bridge circuit with reset lockout and an independent trip mechanism is shown.

Referring to FIGS. 25–28*b*, a reset lockout mechanism and independent manual trip are provided for the device of FIGS. 1–21.

The device of FIGS. 1–21 has a reset mechanism that operates as follows. When the reset button is pressed down, the end of the reset pin centers the holes on the latch and the lifter, allowing the reset pin to go through the holes. Once the pin is through the holes, the latch spring moves the latch to its normal position. The device is then in a "reset position" (contact made between line & load). When the solenoid fires (due to a fault or by pressing the test button) the plunger opens the latch and releases the reset pin.

Referring to FIGS. 25–28*b*, an embodiment of a reset mechanism has a disc 510 toward the end reset shaft 502 attached to reset button 500. When the reset button 500 is pressed down, the reset pin disc 510 interferes with latch 530 because of misalignment between the hole 534 in the latch 530 and the reset pin disc 510 as shown in FIG. 26. When this occurs, the device is in a locked out state. Continuing the downward movement of the reset shaft 502 causes the test switch 550 to close. The test, if successful, will cause the solenoid (not shown) to fire, thereby aligning the hole 534 in the latch 530 with the reset pin disc 510. When the reset pin disc 510 passes fully through the latch 530, the latch returns to its normal position shown in FIG. 28 *a* and a return spring (not shown) pulls the reset disc 510 upward into a reset position, thereby closing the contacts (not shown). A manual trip is provided, whereby a test button shaft is angled at a distal end such that it will force latch 532 through a cam action such that the reset pin disc 510 will clear hole 534 and the device will reset.

Figure 29A:
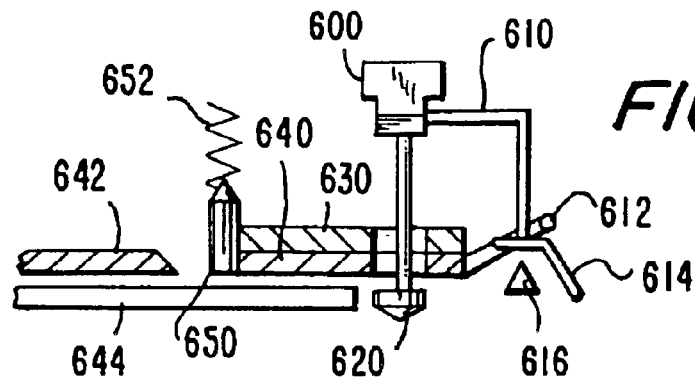
FIGS. 29a–c are partial cutaway diagrams of the reset lockout mechanism of a GFCI according to another embodiment of the present invention.
Figure 29B:
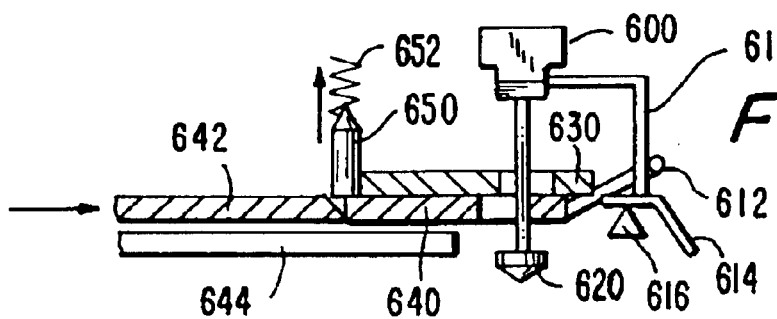
Figure 29C:
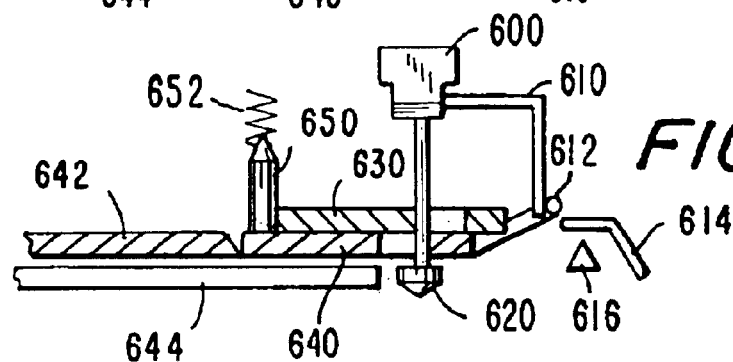
Figure 30:
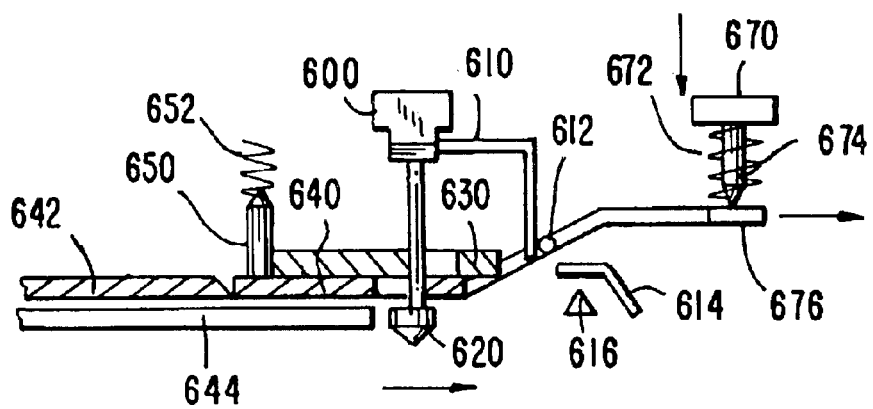
FIG. 30 is a partial cutaway diagram of the reset lockout mechanism of a GFCI according to the embodiment of FIG. 29a–c showing a manual trip mechanism.
Figure 3I:
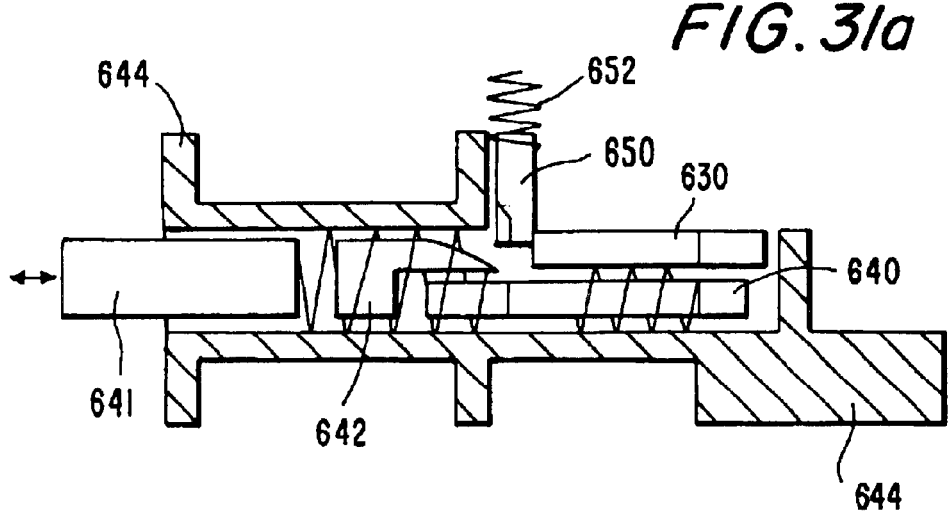
Figure 3I:
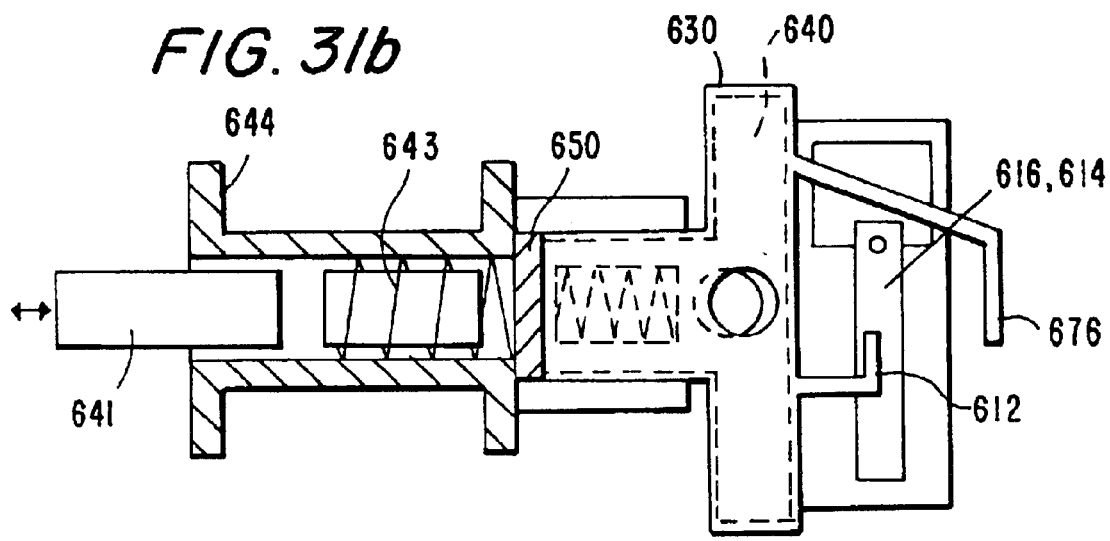
Figure 3I:
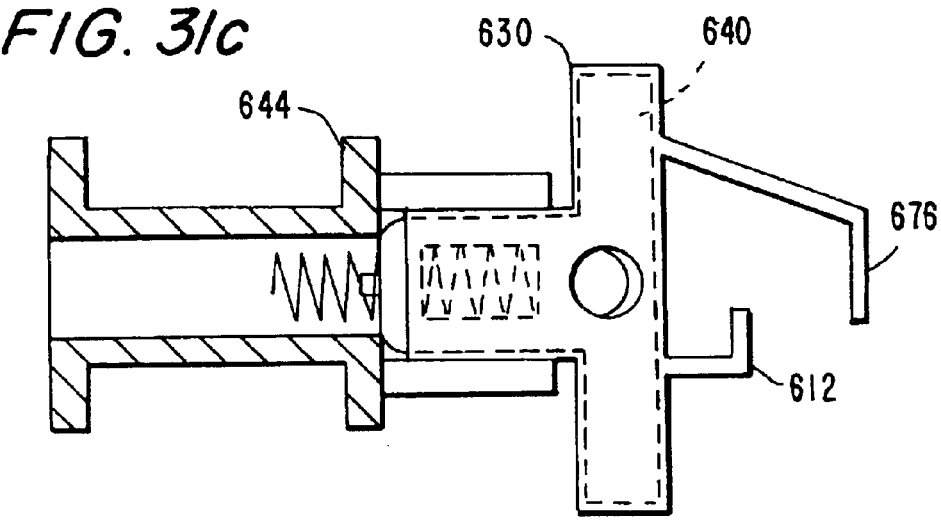
Figure 31D:
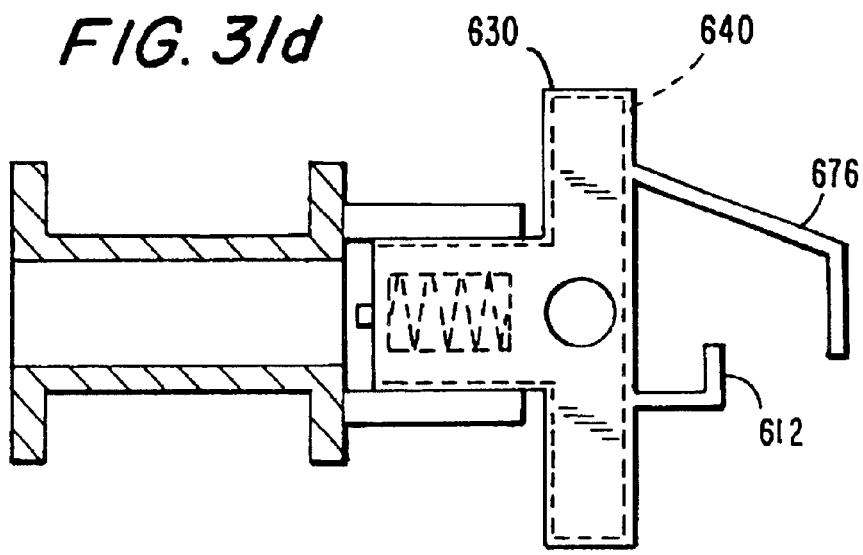
Figure 31E:
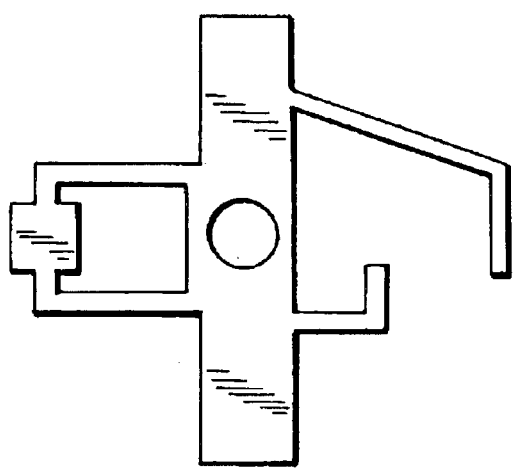
Figure 31F:
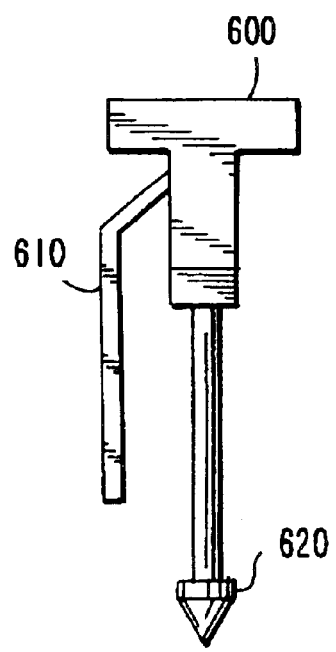

Referring to FIGS. 29*a*–30, another embodiment of a reset mechanism has a reset button 600 and a reset end 620. When the reset button 600 is pressed down the latch 640 moves to an opened position as in the embodiment above. In this embodiment, a spacer 650 keeps the latch 640 in its opened position, preventing engagement of the reset pin end 620. The spacer 650 is forced into place, between the lifter 630, latch 640 and bobbin 644 by a spring 652.

While the reset button 600 is pushed down, the test switch pin 610 activates a test switch 616. If the device is able to fire the solenoid (not shown), it will fire and cause the plunger extension ramp 642 to push the spacer 650 away from the latch 640, allowing it to close. The device is now in a "reset position".

As can be appreciated, the test switch pin 610 cannot activate the test switch 616 while the device is in the "reset position" as shown in FIG. 29*c*.

As can be appreciated, If the solenoid (not shown) fails to fire for any reason, the reset button 600 can be released by pressing the manual trip button 670 (may be marked test button). When the test button 670 (biased upward by spring 672) is depressed, the profile at the end of the shaft 674 acts as a cam against an arm 676 on the latch 640, causing it to open up and release the reset pin end 620 which is biased upward.

As can be appreciated, the reset button 600 can be fully depressed, without obstruction and returned to its upper position without engagement, if the solenoid does not fire for any reason.

Refering to FIGS. 31*a*–*f*, various views of the components of the reset lockout mechanism of this embodiment as described above in various stages of operation are shown.

Figure 32A:
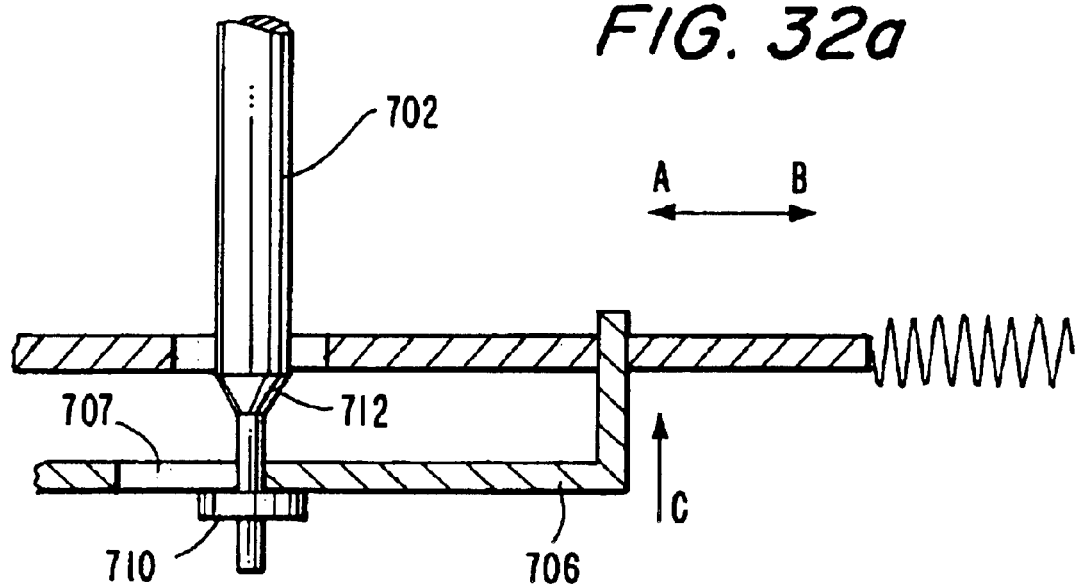
FIGS. 32a–b are partial cutaway diagrams of the reset lockout mechanism of a GFCI according to another embodiment of the present invention.
Figure 32B:
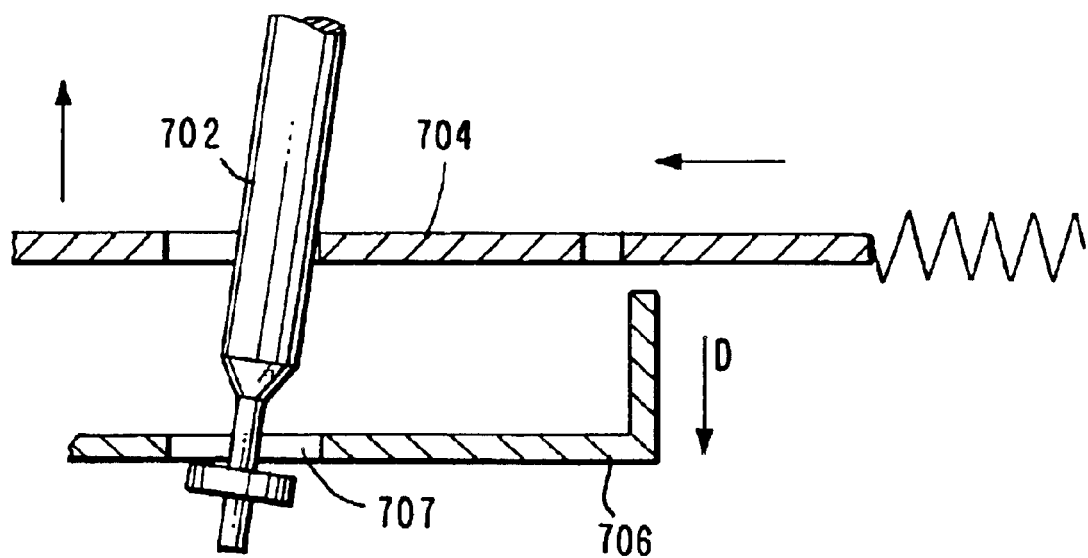

Referring to FIGS. 32*a*–*b*, another embodiment of the present invention is shown using a single button activation method for reset lockout. In this embodiment, the device resets as shown in the device of FIG. 25. The lockout method is also the same. When the device is in the reset position, as shown in FIG. 32*a*, the latch plate 706 moves up in direction C and holds a tilt plate 704 into a "ready" position. At this point, pushing down on the reset button (not shown) causes the latch plate 706 to release the tilt plate 704 when shoulder 712 hits 706. The tilt plate 704 then pushes against the reset pin 702, causing it to tilt forward and remain in that position as shown in FIG. 32*b*. As the reset button (not shown) is released, the spring (not shown) that biases the reset pin 702 pulls the reset pin upward in direction C, the bottom of the reset pin 710 passes thru the hole in the latch plate 707 because the reset pin 702 is still being tilted as shown in FIG. 32*b*. When the reset button (not shown) is fully up (not shown), the reset pin 702 acts as a cam, and pushes the tilt plate 704 back into a locked position (not shown). The device has now been tripped manually.

The mechanism of this embodiment allows the device to be placed in a reset position, and then a trip position, with the use of only one button. The operation of the device of this embodiment is similar to that of a latching push button switch.

Figure 33A:
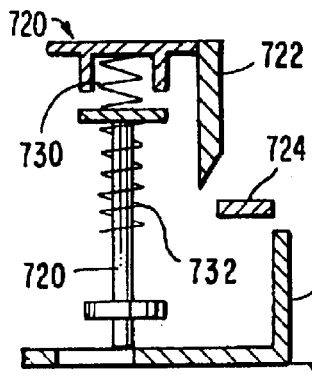
FIGS. 33a–f are partial cutaway diagrams of the reset lockout mechanism of a GFCI according to another embodiment of the present invention.

Referring to FIGS. 33*a*–*f*, another embodiment of the present invention is shown using a single button activation method for reset lockout. In this embodiment, the device of FIG. 25 may be used with this single button activation method of the reset lockout mechanism. In this embodiment, a two piece reset button 720 resets and trips the GFCI. The operation of this embodiment is similar to that of a latching push button switch. The device is tripped (contacts open) when the button 720 is up as shown in FIG. 33*a*. When the button 720 is pushed down, the device will reset only if the test succeeds. If the test, such as a simulated ground fault, fails, the button 720 will be locked out and will not reset.

Figure 33B:
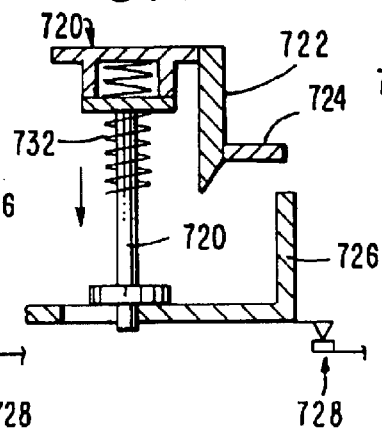
Figure 33C:
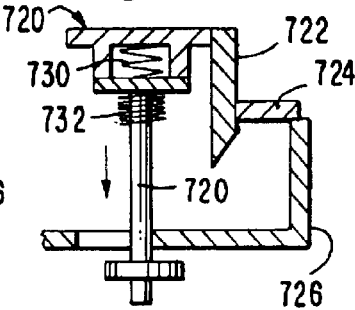
Figure 33D:
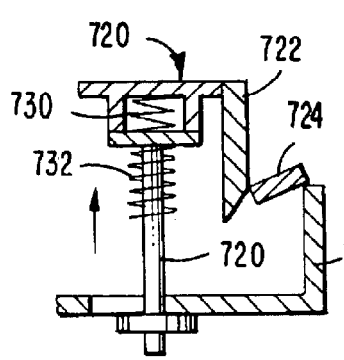
Figure 33E:
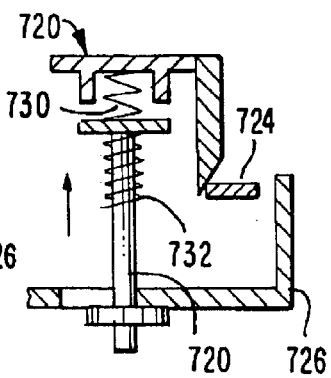
Figure 33F:
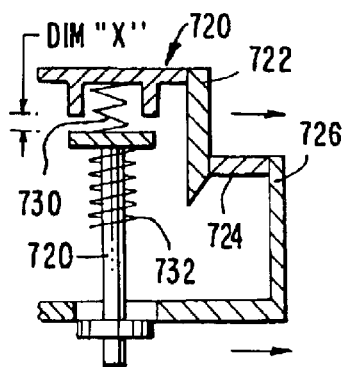

Starting with the GFCI in the reset position (power contacts closed). Pushing the button 720 trips the device, and the button 720 comes up. A trip arm 722, connected to the upper part of the reset button 720, uses a cam action to push a trip block 724 against a latch plate 726. The action causes the latch plate 726 to move and release. The device then acts according to the device of FIG. 25. It has a test switch 728. The two piece reset button 720 has two springs 730 and 732 to produce two different actions, when the reset button is pressed. A first portion of travel through a reset button depression may force a mechanical trip, while a second portion may use reset lockout to require a successful test before resetting the device. FIG. 33a shows the device in a tripped, contact open state. FIG. 33b shows the device locked out. FIG. 33e shows the device in a reset, contacts closed state.

Figure 34A:
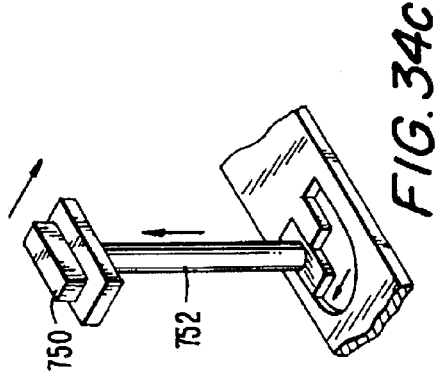
FIGS. 34a–f are partial cutaway diagrams of the reset lockout button of a GFCI according to two embodiments of the present invention.
Figure 34B:
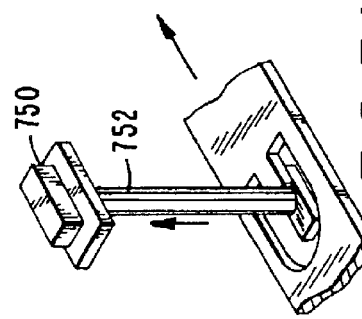
Figure 34C:
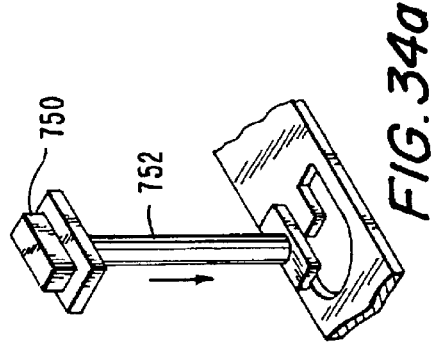
Figure 34D:
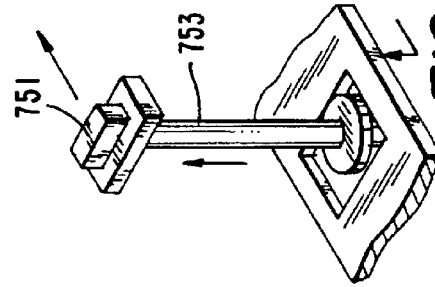
Figure 34E:
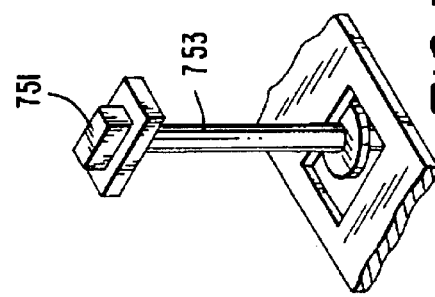
Figure 34F:
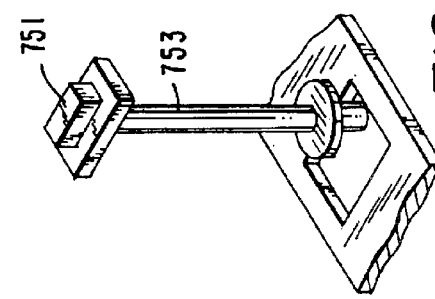

Referring to FIGS. 34a–c and 34d–f, two additional embodiments of the present invention are shown using a single button activation method for reset lockout. In this embodiment, the device of FIG. 25 may be used with this single button activation method of the reset lockout mechanism. When the plunger 752, 753 of a reset lock out mechanism is engaged, normally to trip the GFCI mechanically, a separate test or trip button is used. That button may move a sliding plate to a position by which the shaft 752, 753 (plunger) will be free to release (tripped) just as if the solenoid (not shown) fired. As shown in this embodiment, this disengagement can done with the same reset button 750, 751 where the shaft (plunger) 752, 753 is acting as a lever. With the shaft 752, 753 engaged as shown in FIGS. 34b and e, one can use the button 750, 751 as toggle type switch as shown in FIGS. 34c and f to trip the mechanism.

The use of a GFCI as a representative circuit interrupter is illustrative only and not to be considered limiting. With reference to FIGS. 35–41, a GFCI 810 with a user load activated switching device is shown.

Figure 35:
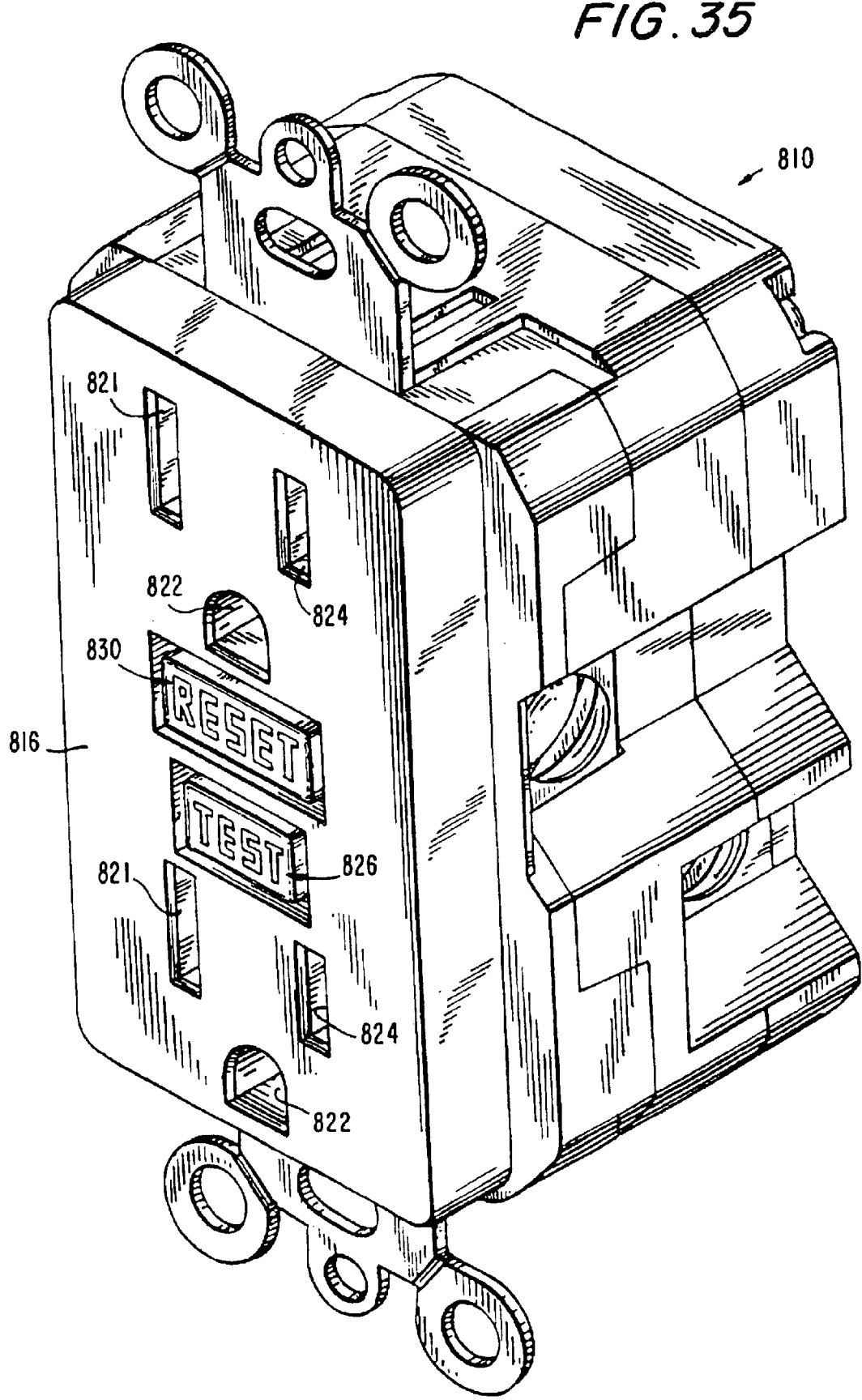
FIG. 35 is a perspective view of one embodiment of a ground fault circuit interrupting device according to the present application having a user load activated switch.
Figure 36A:
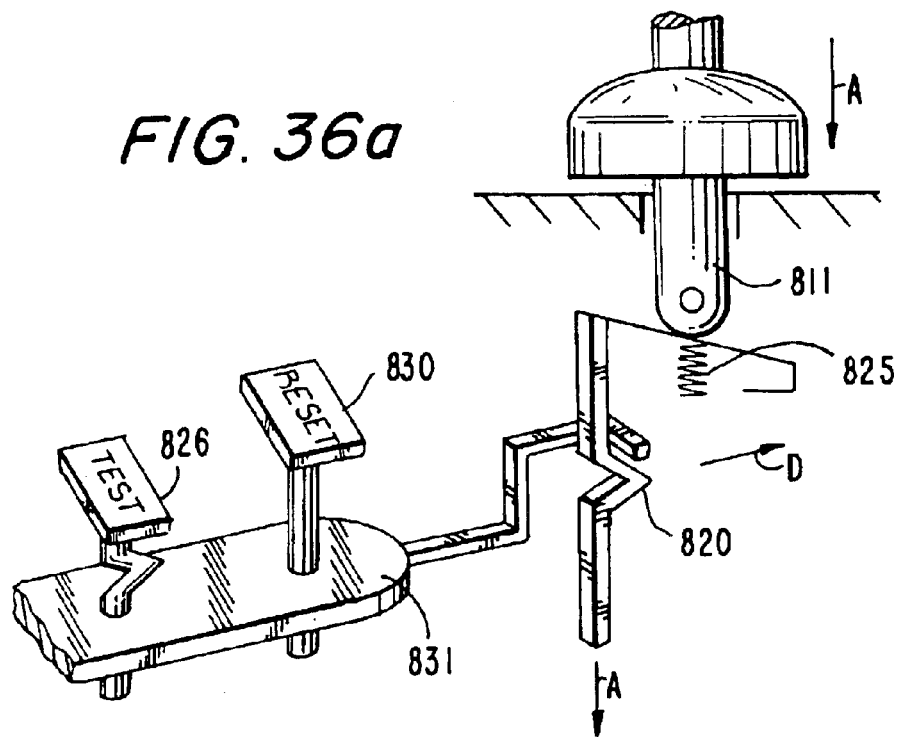
FIGS. 36a–b are perspective views of one embodiment of a ground fault circuit interrupting device according to the present application having a user load activated switch device.

Referring to GFCI 810 of FIG. 35, as shown in FIG. 36a, each time a user inserts a plug having plug blades 811 into the device, a mechanical trip is initiated. User plug blade 811 engages trigger arm 820, that is biased by spring 825. As the trigger arm 820 travels in direction A, a cam action forces sliding plate 831 that first moves in direction D. The device 810 is mechanically tripped and the reset lockout mechanism must allow a reset before the device 810 will supply power to the user load. As can be appreciated, the user receptacle may exert enough force to hold plug 811 in place despite the force exerted by bias spring 825.

Figure 36B:
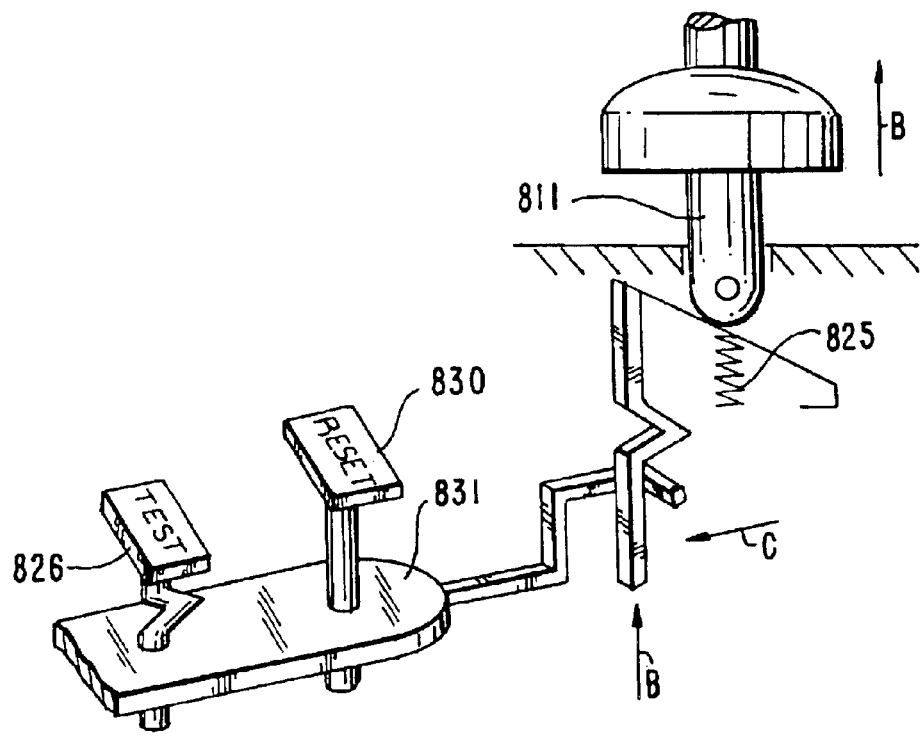

Referring to FIG. 36b, each time a user removes a plug having plug blades 811 from the device, a mechanical trip is initiated. User plug blade 811 engages trigger arm 820, that is biased by spring 825. As the blade 811 travels in direction B, the spring 825 forces trigger arm 820 to travel in direction B and sliding plate 830 first moves in direction C. The device 810 is again mechanically tripped and the reset lockout mechanism must allow a reset before the device 810 will supply power to the user load.

As can be appreciated, a GFCI receptacle with more than one user receptacle may utilize two such switches that may also utilize common components to initiate the trip mechanism. Similarly, the device may be configured to trip only when the first plug is inserted or only when the last plug is removed.

Accordingly, in this embodiment, a user is forced to manually reset the device for each use—a test-to-use arrangement when used with a reset lockout GFCI. In the device of this embodiment employing a reset lock out mechanism, the device will only be reset is the GFCI is operational, not in an open neutral condition and not reverse wired.

In this embodiment an independent mechanical trip is initiated. However, a momentary switch may be utilized to provide for an electrical test based trip of the device as described above. The electrical test circuits described above may be utilized to initiate a device trip. Of course, the device may be manufactured or initiated into a reset lock out state as described above. Additionally, the trigger arm bias can be provided with other known means including a trigger arm mounted to provide a spring bias.

Figure 37:
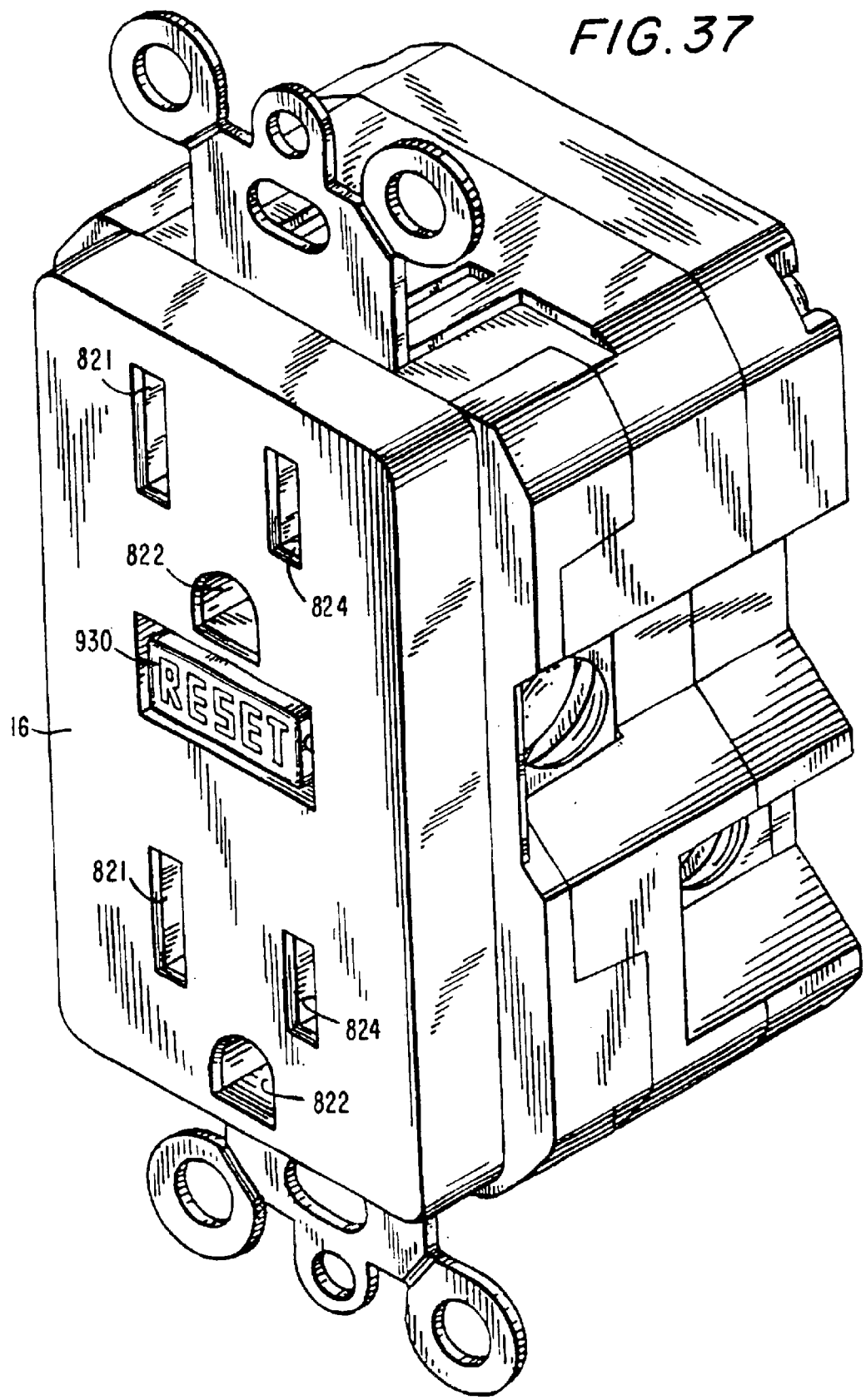
FIG. 37 is a perspective view of one embodiment of a ground fault circuit interrupting device according to the present application having a user load activated switch.
Figure 38A:
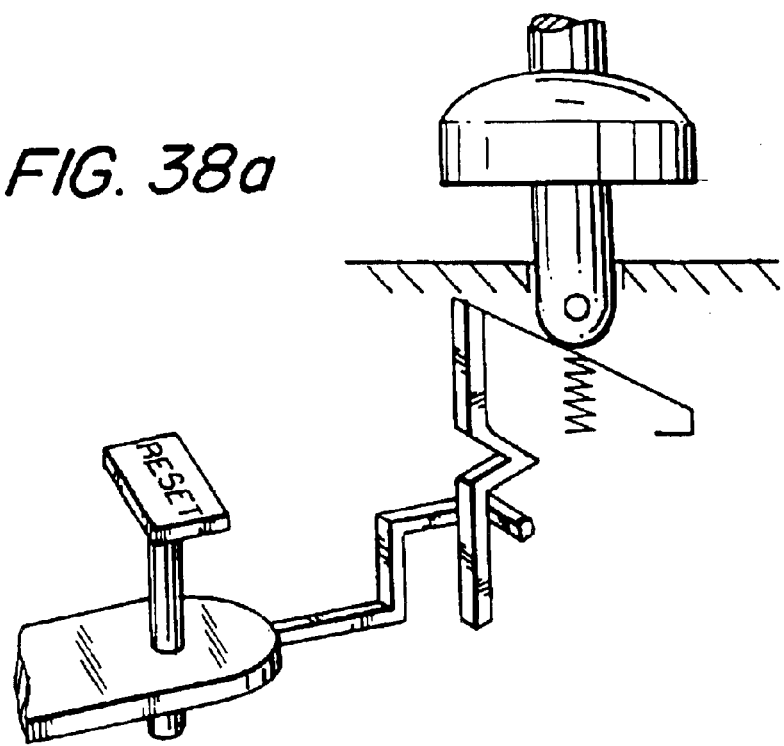
Figure 38B:
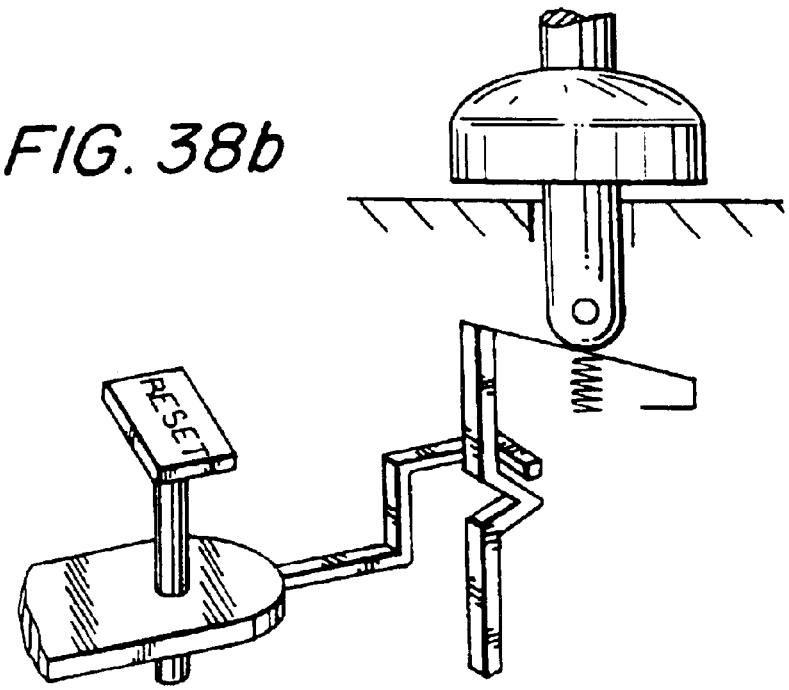

With reference to FIGS. 37 and 38a–b, a device with only a reset button is shown. Because the plug will initiate a mechanical trip each time it is inserted or removed, there may be no need for a test or trip button. The device of FIGS. 38a–b is the same as the one of FIGS. 36a–b except there is no test button mechanism.

Figure 39:
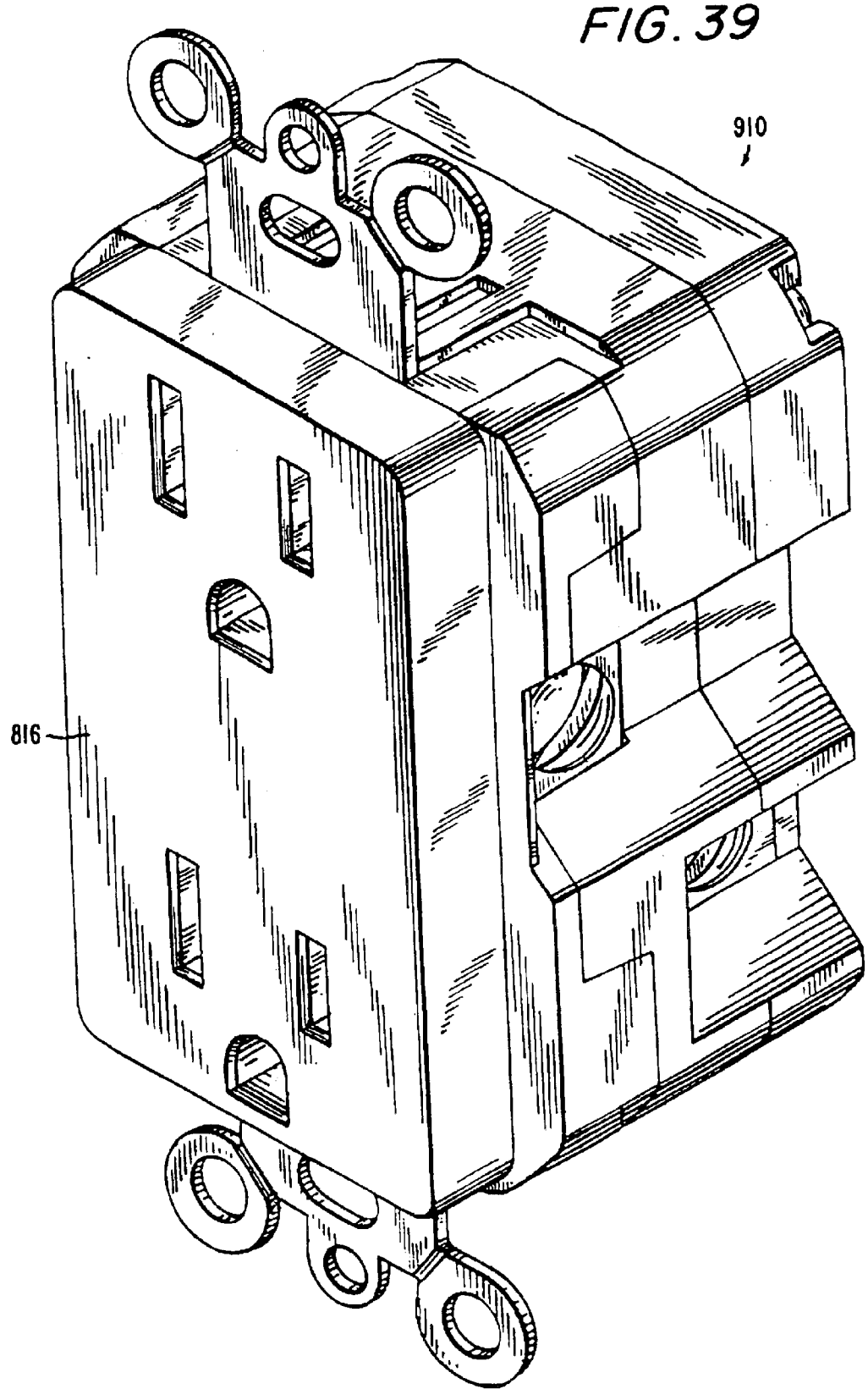
FIG. 39 is a perspective views of one embodiment of a ground fault circuit interrupting device according to the present application having a user load activated switch devices for trip and reset activation without user buttons.

With reference to FIG. 39, another embodiment of the present invention is shown. An automatic test GFCI device 910 is shown that is configured to automatically test itself when a user load is accessed. A user load activated spring and switch such as shown in FIG. 36a will execute a trip and reset that will be locked out if the device is non-operational, in an open neutral state or reverse wired. When the user plug 811 is removed, the device may again be tripped. As can be appreciated, for a duplex user receptacle such as that of device 810, the first plug inserted may execute the test and reset, while the last plug removed may trip the device into a standby tripped state. Accordingly, because a trip and reset lockout test is accomplished for each plug insertion, there may be no need for user buttons.

Figure 40:
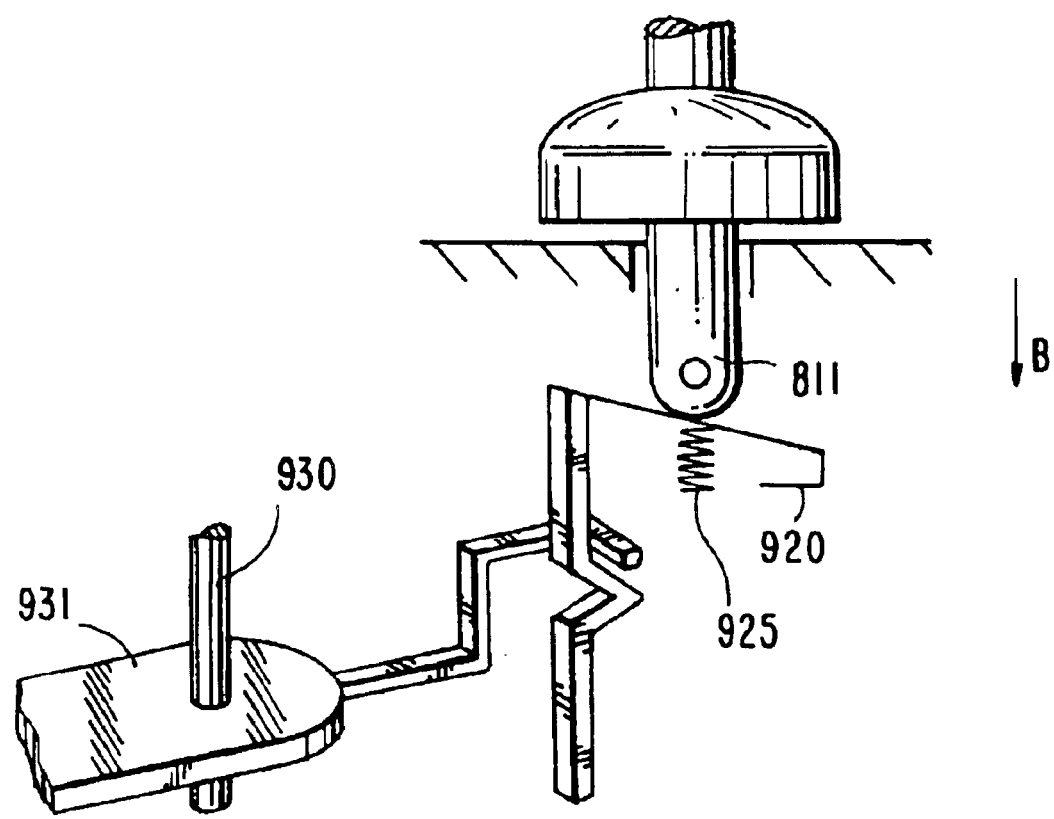
FIG. 40 is a perspective view of one embodiment of a ground fault circuit interrupting device according to the present application having a user load activated switch device and no buttons.

As shown in FIG. 40, the mechanism for a buttonless device 910 is shown. Plug prong 911 will engage trigger arm 920, that is biased by spring 925. As the blade 911 travels in direction B, the trigger arm 920 first mechanically trips the device with a low cam forcing sliding plate 931 to release the reset shaft 930 to a tripped position. The trigger arm continues down until it contacts reset shaft 930 and engages a test to reset lock out mechanism as described above. Accordingly, a device may not require any buttons and is preferably delivered in a tripped state.

Figure 41:
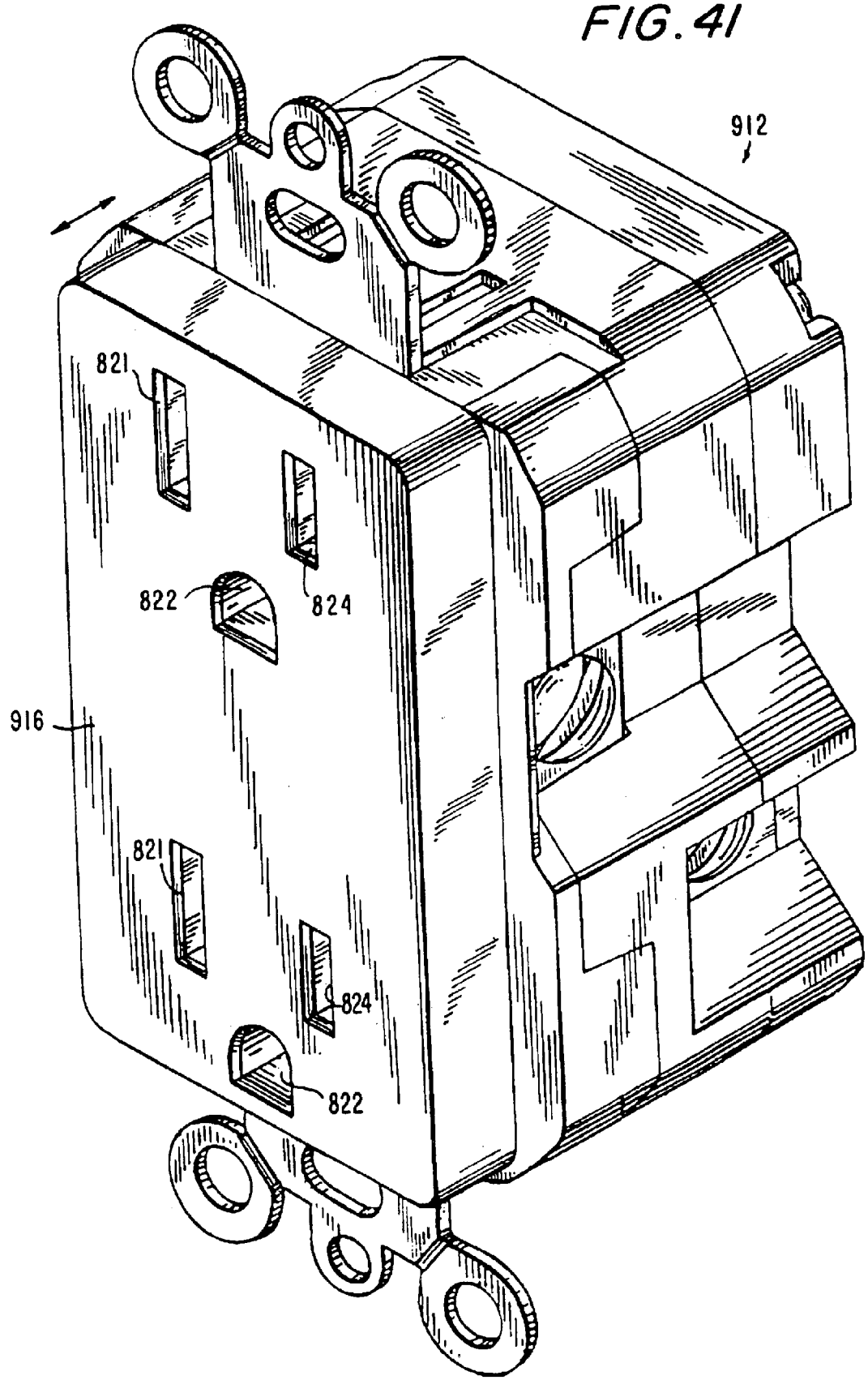
FIG. 41 is a perspective views of one embodiment of a ground fault circuit interrupting device according to the present application having a movable face plate and face plate movement activated switch devices for trip and reset activation without user buttons.

With reference to FIG. 41, another embodiment of the present invention is shown. An automatic test GFCI device 912 is shown that is similar to device 910, except that the user load switch activation mechanism is activated by pressure on a face plate 916 that is biased to an outward position and forced in when a user plug is inserted.

As noted, although the components used during circuit interrupting and device reset operations are electromechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. A circuit interrupting device comprising:
   a housing;
   a phase conductive path and a neutral conductive path
      each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;

a circuit interrupting portion disposed within said housing and configured to cause electrical discontinuity in said phase and neutral conductive paths between said line side and said load side upon the occurrence of a predetermined condition;

a reset portion disposed at least partially within said housing and configured to reestablish electrical continuity in said phase and neutral conductive paths and connected to a lever which is operated by insertion of a user plug which initiates a mechanical trip of said device each time said plug is removed;

said circuit interrupting device further comprising a reset lockout portion that prevents reestablishing electrical continuity in said phase and neutral conductive paths if said circuit interrupting portion is non-operational, if an open neutral condition exists or if a reverse wiring condition exists; and said reset portion comprising a manually operated reset latch lever, and a slidable latch plate adapted to engage said manually operated reset latch lever to reestablish electrical continuity in the phase and neutral conductive paths subsequent to the removal of said plug from said device if not prevented from doing so by said reset lockout.

* * * * *